United States Patent
Usami

(10) Patent No.: US 11,206,344 B2
(45) Date of Patent: Dec. 21, 2021

(54) IMAGE PICKUP APPARATUS AND STORAGE MEDIUM

(71) Applicant: CANON KABUSHIKI KAISHA, Tokyo (JP)

(72) Inventor: Takahiro Usami, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/987,198

(22) Filed: Aug. 6, 2020

(65) Prior Publication Data
US 2021/0044733 A1    Feb. 11, 2021

(30) Foreign Application Priority Data

Aug. 7, 2019    (JP) ............... JP2019-145629

(51) Int. Cl.
     *H04N 5/225*    (2006.01)
     *H04N 9/093*    (2006.01)
     *H04N 5/232*    (2006.01)

(52) U.S. Cl.
     CPC ....... *H04N 5/2258* (2013.01); *H04N 5/23296* (2013.01); *H04N 9/093* (2013.01)

(58) Field of Classification Search
CPC .. H04N 5/2258; H04N 9/093; H04N 5/23296; H04N 5/232935; H04N 5/232127; H04N 5/23219

See application file for complete search history.

(56) References Cited

U.S. PATENT DOCUMENTS

| 8,284,257 B2 | 10/2012 | Fukui |
| 2019/0253597 A1* | 8/2019 | Satou ............... H04N 5/353 |

FOREIGN PATENT DOCUMENTS

| JP | 2005-338352 A | 12/2005 |
| JP | 2010-081587 A | 4/2010 |

* cited by examiner

*Primary Examiner* — Yogesh K Aggarwal
(74) *Attorney, Agent, or Firm* — Cowan, Liebowitz & Latman P.C.

(57) ABSTRACT

In order to perform image processing in which relative positional deviation of image outputs between two image pickup units is suppressed, an image pickup apparatus comprises: an imaging device that has a first image pickup unit configured to perform imaging in a first cycle and generate a first image signal, and a second image pickup unit configured to perform imaging in a second cycle shorter than the first image pickup unit and generate a plurality of second image signals; a relation degree information generation unit configured to generate relation degree information between the first image signal and the second image signal based on overlap between an exposure time period in the first image pickup unit and an imaging timing in the cycle of the second image pickup unit; a region selection unit configured to select a specific region from among the second image signals based on the relation degree information generated by the relation degree information generation unit; and an image processing unit configured to perform predetermined image processing on the first image signal based on the specific region selected by the region selection unit.

12 Claims, 20 Drawing Sheets

IMAGE PICKUP APPARATUS AND STORAGE MEDIUM

BACKGROUND OF THE INVENTION

Field of the Invention

The present invention relates to an image pickup apparatus and the like, and, in particular, relates to an image pickup apparatus having a plurality of image pickup units.

Description of the Related Art

In image pickup apparatuses such as a digital camera, a function referred to as an "object tracking function" that tracks an object included in an image is known. The image pickup apparatus having this object tracking function disclosed, for example, in Japanese Patent Laid-Open No. 2010-81587, facilitates a photographer recognizing an object by displaying a tracking frame on an object to be tracked during live view (hereinafter, referred to as "LV") display.

Additionally, Japanese Patent Laid-Open No. 2005-338352 discloses a technique in which an image pickup element for tracking an object (hereinafter referred to as a tracking image pickup element) is provided separately from an image pickup element for recording/displaying video (hereinafter referred to as a recording video image pickup element) to pick up images of the object in the same shooting ranges and to display a tracking frame by detecting an object to be tracked.

However, the image pickup apparatus disclosed in Japanese Patent Laid-Open No. 2005-338352 illustrates a configuration in which a plurality of images for tracking are picked up during one frame period for the recording video in order to improve the detection performance and the tracking performance for the object. In this case, imaging cycle and exposure start timing of the tracking image pickup element are different from those of the recording video image pickup element.

As an imaging technique in an image pickup element when performing image pickup for recording video image or image pickup for tracking, readout control by using what is referred to as the "rolling shutter method", which reads out accumulated charges from the upper part to the lower part of the image pickup element on a line-by-line basis, is typically used. In the readout by using the rolling shutter method, the readout timing between the upper part and the lower part of the image pickup element is different.

Hence, when the position of the object moves on an imaging plane, distortion of the captured image is caused due to the difference in the timing for reading out charges of the image pickup element (rolling shutter distortion). The amount of rolling shutter distortion varies depending on the imaging cycle of the image pickup element.

Here, image processing using a tracking region of the object to be tracked, which is generated based on an image signal (tracking image signal) captured by the tracking image pickup element with respect to an image signal (LV image signal) captured by the recording video image pickup element is taken into consideration. If the imaging cycle of the tracking image pickup element and the imaging cycle of the recording video image pickup element are the same and the exposure start timings thereof are also synchronized, no deviation occurs between the tracking region position and the object position so that appropriate image processing can be performed.

However, there are cases in which the imaging cycle and the exposure start timing between the tracking image pickup element and the recording video image pickup element are different. In this case, when the object to be tracked moves, the tracking region position created from the tracking image signal may deviate from the object position in the LV image signal due to the difference in exposure start timing and the difference in the amount of distortion of the rolling shutter distortion.

As described above, in the prior art, the deviation between the tracking region position created from the tracking image signals and the object position on the LV image signals when the imaging cycle and exposure start timing between the tracking image pickup element and the recording video image pickup element are different is not taken into consideration.

SUMMARY OF THE INVENTION

It is an object of the present invention to provide an image pickup apparatus that suppresses relative positional deviation between image outputs of two image pickup units.

An image pickup apparatus that is one aspect of the present invention comprises: an imaging device that has a first image pickup unit configured to perform imaging in a first cycle and generate a first image signal, and a second image pickup unit configured to perform imaging in a second cycle shorter than the first image pickup unit and generate a plurality of second image signals; at least one processor or circuit which function as: a relation degree information generation unit configured to generate relation degree information between the first image signal and the second image signal based on overlap between an exposure time period in the first image pickup unit and an imaging timing in the cycle of the second image pickup unit; a region selection unit configured to select a specific region from among the second image signals based on the relation degree information generated by the relation degree information generation unit; and an image processing unit configured to perform predetermined image processing on the first image signal based on the specific region selected by the region selection unit.

Further features of the present invention will become apparent from the following description of exemplary frameworks with reference to the attached drawings.

DESCRIPTION OF THE EMBODIMENTS

Figure 1:
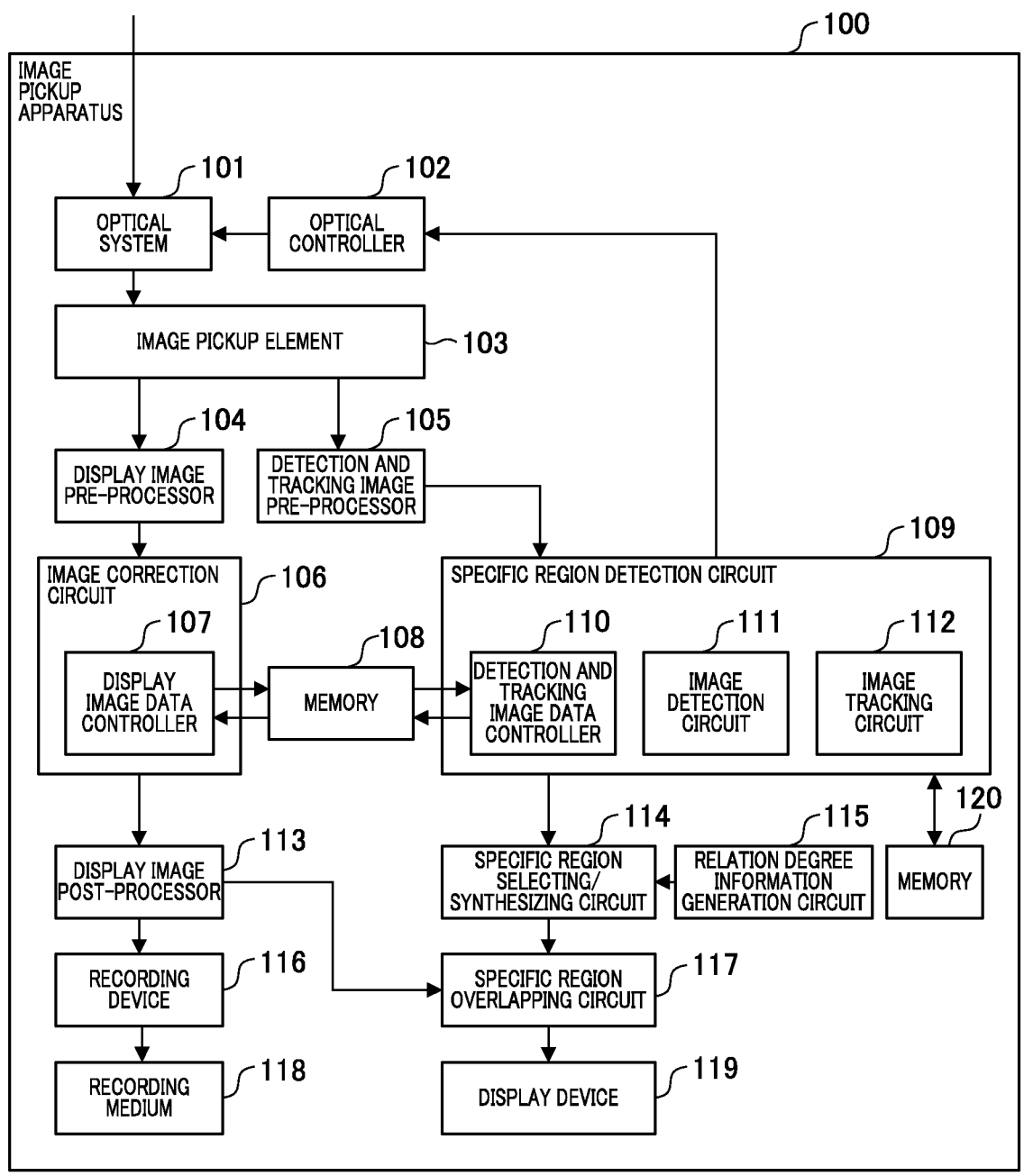
FIG. 1 is a block diagram of an image pickup apparatus according to Embodiment 1.

Hereinafter, preferred embodiments of the present invention will be described with reference to the accompanying drawings. In each drawing, the same reference numerals are provided to the same members or components and redundant descriptions will be omitted or simplified. In the embodiments, an example applied to a digital still camera serving as an image pickup apparatus will be described. However, the image pickup apparatus includes electronic apparatuses having an imaging function such as a digital movie camera, a smartphone with a camera, a tablet computer with a camera, and a network camera.

Embodiment 1

An outline of Embodiment 1 will be described. An image pickup apparatus 100 according to Embodiment 1 displays to overlap a tracking frame generated from a tracking image signal on an LV image generated from LV image signals. FIG. 1 schematically illustrates the internal structure of the image pickup apparatus 100 according to Embodiment 1. The image pickup apparatus 100 includes an optical system 101, an optical controller 102, an image pickup element 103, a display image pre-processor 104, a detection and tracking image pre-processor 105, and an image correction circuit 106.

The image pickup apparatus 100 also includes a display image data controller 107, a memory 108, a specific region detection circuit 109, a display image post-processor 113, a specific region selecting/synthesizing circuit 114, a relation degree information generation circuit 115, a recording device 116, a specific region overlapping circuit 117, a recording medium 118, a display device 119, and a memory 120. The specific region detection circuit 109 includes a CPU inside thereof to serve as a computer, and functions as a control unit that executes various operations for the entire apparatus based on a computer program stored in the memory 120.

The display device 119 is, for example, an LCD panel or an organic EL panel, and displays, for example, a display image with a tracking frame in which a main object tracking frame is overlapped on a display image by the specific region overlapping circuit 117. The optical system 101 includes a plurality of lenses such as a zoom lens and a focus lens, and forms an image of optical information from an object on an image pickup element 103.

The image pickup element 103 is, for example, a CMOS (Complementary Metal Oxide Semiconductor) image sensor, and converts the optical information formed by the optical system 101 into electrical information. In the present embodiment, the image pickup element 103 is configured so as to output in parallel the LV image signals and the tracking image signals each having different imaging cycles and imaging start timings. Here, imaging means picking up an image or accumulating an image signal.

Specifically, a (first) image pickup unit for outputting the LV image signals and a (second) image pickup unit for outputting the tracking image signals are provided in the same image pickup element. Note that the (first) image pickup unit for outputting the LV image signal and the (second) image pickup unit for outputting the tracking image signal may be configured by different image pickup elements.

The display image pre-processor 104 converts the LV image signals (first image signals) that are imaged and generated in a first cycle by the image pickup element 103 serving as the first image pickup unit into signals (LVRGB signal) having RGB colors. The image correction circuit 106 performs various types of image correction processing on the LVRGB signals converted by the display image pre-processor 104, such as white balance correction, shading correction, and conversion of the RGB signals into YUV signals.

When the image correction processing is performed on the LVRGB signals, the display image data controller 107 in the image correction circuit 106 writes and reads the LVRGB signals or the converted YUV signals to the memory 108. Thus, the image correction processing for a plurality of lines or a plurality of frames can be executed. In this context, the line (vertical line) refers to a line in the horizontal direction on the screen. In this context, the vertical line means vertically arranged horizontal line.

The display image post-processor 113 converts the LVRGB signals produced by the image correction circuit 106 that performs the image correction processing or the YUV signals produced by the image correction circuit 106 that performs the conversion processing into recording video image signals for recording on the recording medium 118. The recording video image signals may be, for example, compressed data signals compatible with JPEG. Additionally, the display image post-processor 113 converts live view RGB signals produced by the image correction circuit 106 that performs the image correction processing or the YUV signals produced by the image correction circuit 106 that performs the conversion processing into display image signals for display on the display device 119.

The display cycle in the display device 119 is the same as the imaging cycle of the LV image signal in the image pickup element 103. Additionally, the display image post-processor 113 converts the LVRGB signals input from the image correction circuit 106 or the converted YUV signals into an optimal image size for each frame for display by the display device 119.

In a case in which the display cycle in the display device 119 may be different from the imaging cycle of the LV image signal, for example, the display cycle is 30 fps (Frame per Second) and the imaging cycle is 60 fps. In this case, the display image post-processor 113 performs conversion to the display image signal once every two frames.

If the display cycle is 60 fps and the imaging cycle is 30 fps, the same display is repeated in the display device 119 for two frame time periods with respect to the output of one frame of the display image signals from the display image post-processor 113. Thereby, display processing when the output of the display image post-processor 113 is not in time for the display cycle of the display device 119 is performed.

The recording device 116 records the recording image signals converted by the display image post-processor 113 on the recording medium 118. As the recording medium, flash memory including an SD memory card and a CF card is used. The detection and tracking image pre-processor 105 converts the tracking image signals (second image signals), which have been imaged and generated in a second cycle shorter than the first cycle (one integral fraction of the first cycle) by the image pickup element 103 serving as the second image pickup unit, into signals having each RGB color (tracking RGB signals).

The specific region detection circuit 109 has a detection and tracking image data controller 110, an image detection circuit 111, and an image tracking circuit 112. The detection and tracking image data controller 110 performs image correction processing such as white balance correction, shading correction, and conversion of the RGB signals into the YUV signals, on the tracking RGB signal converted by the detection and tracking image pre-processor 105.

The image detection circuit 111 detects one or more objects from the tracking RGB signals (second image signals) for each frame, and determines a main object from the detected object(s). The image tracking circuit 112 performs tracking processing that tracks a moving position of the main object determined by the detection processing, in the tracking RGB signals after the next frame.

The detection and tracking image data controller 110 in the specific region detection circuit 109 writes and reads the tracking RGB signals or the converted YUV signals to and from the memory 108. The image detection circuit 111 in the specific region detection circuit 109 extracts, for example, a region feature amount based on edge information from image signals for one frame.

An object is detected from the tracking RGB signals or the converted YUV signals by using an object detection technique that detects a region candidate to be an object based on the extracted feature amount, and a main object is determined from the one or more objects that have been detected.

As a method for determining the main object from among one or more objects, for example, pattern matching, is performed between specific images such as a person's face, an automobile, an animal or the like prepared in advance, and an object candidate region image. Subsequently, the main object is determined based on arbitrary priorities given to objects having high matching rates.

As the arbitrary priorities, a combination of, for example, giving the highest priority to a person's face having a larger size than the other ones, and giving a priority to an object the is the nearest to an autofocus setting frame is appropriately used. Feature information such as edge information or histogram information of the main object determined by the image detection circuit 111 is temporarily stored in the memory 108 through the detection and tracking image data controller 110.

The image detection circuit 111 calculates the size and the centroid position of the main object. Subsequently, specifying a minimum rectangular region including the main object as a specific region, the image detection circuit 111 outputs the specific region position information, the specific region size information, and the main object centroid position information so as to be used as main object detection information. The image tracking circuit 112 reads out the tracking RGB signals, the converted YUV signals, and the feature information of the main object for the past one frame or for the past two or more frames detected by the image detection circuit 111 from the memory 108 through the detection and racking image data controller 110.

Subsequently, the tracking processing of the main object is performed, for example, by determining the object region having the highest similarity to the histogram information of the main object in the tracking RGB signals of the acquired frame or the converted YUV signals as the tracking result region of the main object. The image tracking circuit 112 calculates the size and the centroid position of the main object based on the tracked main object, specify the minimum rectangular region including the main object as the specific region, and outputs the specific region position information, the specific region size information, and the main object centroid position information so as to be used as the main object tracking information.

The tracking processing is configured by using a histogram matching processing technique, a template image matching processing technique, or the like that has a lower amount of calculation than an amount of calculation for object detection using a region feature amount in the detection processing. Hence, the processing can be completed in a time shorter than a time generally required for the detection processing. However, the main object tracking information using the above algorithm has less accuracy than the detection information using the calculation of the feature amount.

A rectangular region to be focused on an imaging plane is determined based on the main object detection information and the main object tracking information detected by the specific region detection circuit 109. The optical controller 102, for example, forms an optical image to be imaged by the image pickup element 103 serving as a phase difference autofocus sensor, and calculates a defocus amount of the rectangular region on the imaging plane. Subsequently, the optical controller 102 performs the focus control of the focus lens based on the defocus amount of the rectangular region.

As the speed of focus control becomes higher, it is easier for a photographer to shoot, so that the imaging cycle of the LV image signal (first cycle) is set to be a cycle longer than the imaging cycle of the tracking image signal (second cycle). In this embodiment, the first cycle is set to be an integral multiple of the second cycle. For example, the imaging cycle of the LV image signal may be 60 fps and the imaging cycle of the tracking image signal may be 240 fps. However, upon transfer of image signals having the same signal amount, the transfer signal amount per time becomes larger as the imaging cycle becomes smaller, and thereby the data transfer load increases.

Therefore, in this embodiment, the image size of the tracking image signal is set to 960 pixels in the horizontal direction and 720 lines in the vertical direction with respect to the image size of the LV image signal, 1920 pixels in the horizontal direction and 1440 lines in the vertical direction. In addition, the imaging cycle of the tracking image signal is set to ¼ of the cycle of the LV image signal, and the resolution of the tracking image signal is set to ¼ of the resolution of the LV image signal. By setting the ratio of the resolution in proportion to the ratio of the cycle described above, a transfer signal amount per time is made equivalent, and thereby the data transfer load is suppressed.

The relation degree information generation circuit 115 generates an exposure overlap map to serve as the relation degree information based on an overlap (ratio) of the imaging timing between the LV image signals for one frame and the tracking image signals for a plurality of frames having different imaging cycles and imaging timings from the LV image signals. The exposure overlap map indicates which tracking frame generated from a tracking image signal corresponding to any one of exposure time periods is optimum as the tracking frame to be overlapped with a displayed image, corresponding to on which line the main object centroid is located.

Figure 2A:
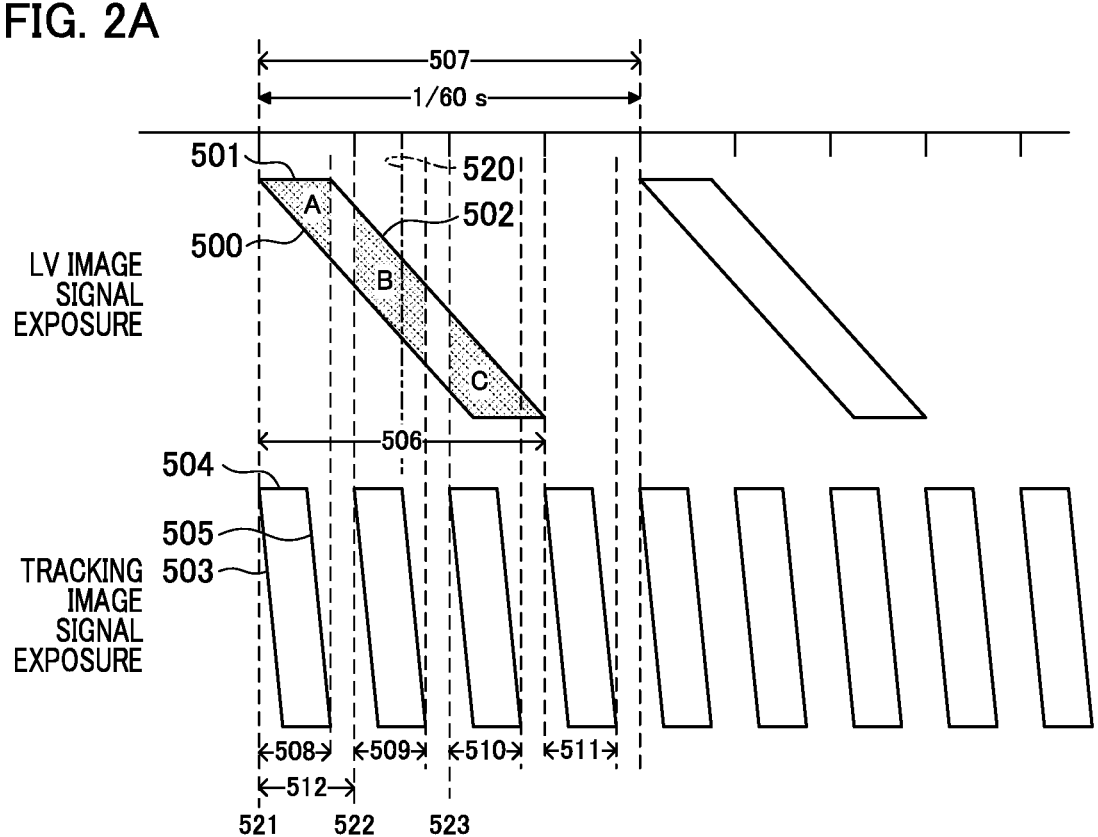
FIG. 2A is a timing diagram illustrating exposure start timing in Embodiments 1 and 2 and FIG. 2B illustrates an overlap ratio of exposure times for each vertical line.
Figure 2B:
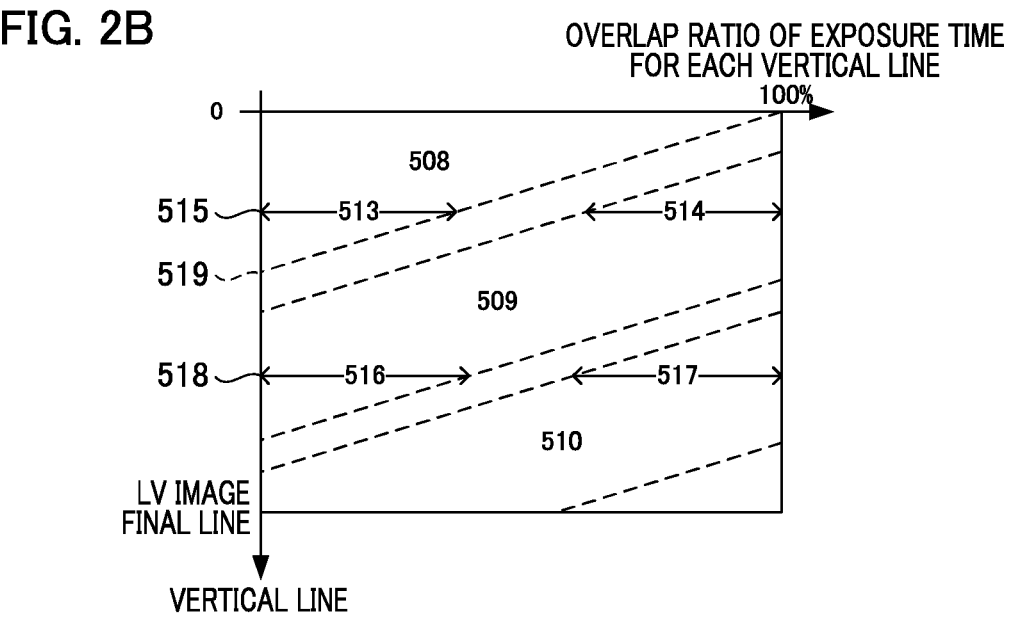

FIGS. 2A and 2B are timing diagrams illustrating exposure start timing in Embodiments 1 and 2. In FIG. 2A, it is assumed that an imaging cycle 507 of the LV image signals is 1/60 sec, an imaging cycle 512 of the tracking image signals is 1/240 sec. 500 denotes a tilt of the rolling shutter of the LV image signal. Additionally, 501 denotes an exposure time (exposure time period) for one line of LV image signal, 502 denotes a signal readout tilt of the LV image signal, 506 denotes an exposure time of the LV image signal for one frame, and 503 denotes a tilt of rolling shutter of the tracking image signal.

Additionally, 504 denotes an exposure time of the tracking image signals for one line, 505 denotes a signal readout tilt of the tracking image signal, and 508, 509, 510, and 511 respectively denote exposure times of the tracking image signals for each frame. The "tilt of rolling shutter" means a tilt of deviation of the exposure start timing for each line, and the "signal readout tilt" means a tilt of deviation of readout timing (exposure end timing) for each line.

At this time, the tilts 500 and 502 have the same tilt angle since the exposure time per line for all the lines are the same. Similarly, the tilt 503 and the tilt 505 have the same tilt angle. A region exposed for the LV image signals during the exposure time 508 of the tracking image signals is denoted by "A", a region exposed for the LV image signals during the exposure time 509 of the tracking image signals is denoted by "B", and a region exposed for the LV image signals during the exposure time 510 of the tracking image signals is denoted by "C".

FIG. 2B illustrates how the exposure times 508, 509, and 510 of the tracking image signals overlap in the exposure of each line when the LV image signals are exposed to all lines. Since, in the uppermost line, the exposure time for one line of the LV image signals and the exposure time 508 of the tracking image signals are equal, they overlap by 100%, and the overlap ratio decreases linearly as the line goes down by one line, and the ratio becomes 0% at a vertical line 519.

Figure 3A:
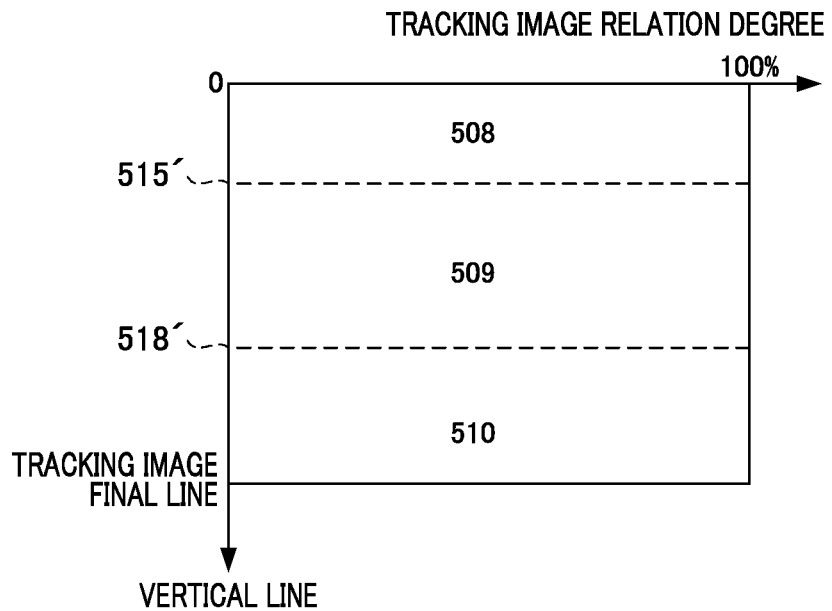
FIG. 3A illustrates an example of the relation degree between an LV image and a tracking image for each vertical line of the tracking image in Embodiment 1.
Figure 3B:
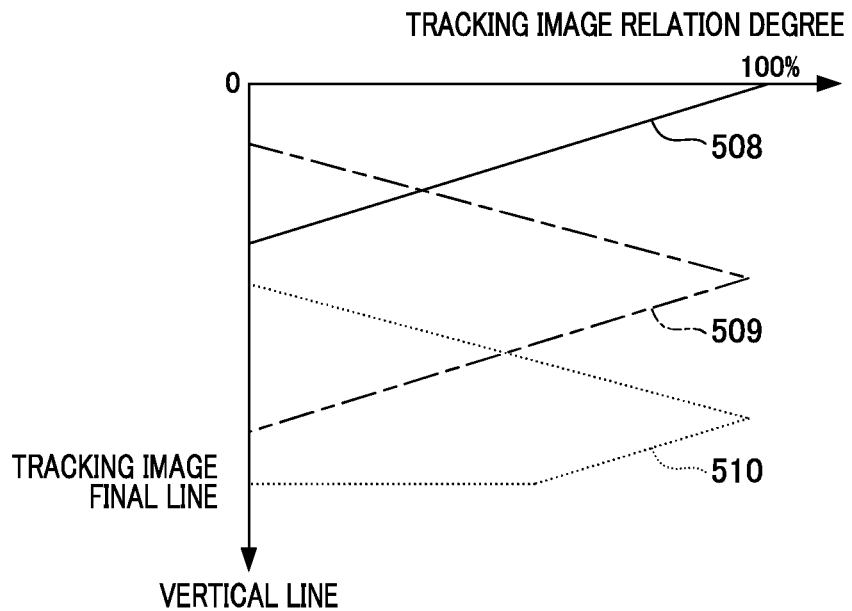
FIG. 3B illustrates an exposure overlap map in which the overlap ratio of the exposure time is used as the tracking image relation degree.

The overlap ratio can be easily calculated based on the tilt 500, the exposure time 501, and the tilt 502 of the LV image signals, the tilt 503, the exposure time 504, and the tilt 505, and the imaging cycle 512 of the tracking image signals. FIGS. 3A and 3B illustrate the relation degree between the LV image and the tracking image for each vertical line of the tracking image in Embodiment 1.

FIG. 3A illustrates that the exposure overlap map indicating which tracking image signal has the highest overlap ratio on each line of the LV image signals among the tracking image signals exposed during the exposure times 508 to 510 is remapped to the tracking image. The tracking image signals having a relatively highest overlap ratio for each line are set to 100% of a tracking image association degree, and the other tracking image signals are set to 0%.

When each angle-of-view of the LV image signals and the tracking image signals are the same, the exposure overlap map can be easily created based on the magnitude relation of the overlap ratio in FIG. 2B. That is, a line 515' at the boundary between 508 and 509 in FIG. 3A indicates the line 515 in which an overlap ratio 513 of the exposure time 508 and an overlap ratio 514 of the exposure time 509 in FIG. 2B are equal.

A line 518' at the boundary between 509 and 510 in FIG. 3A shows a line 518 in which an overlap ratio 516 of the exposure time 509 and an overlap ratio 517 of the exposure time 510 in FIG. 2B are equal. That is, the ratio of 509 is larger than the ratio of 508 in the line below the line 515' at the boundary, and the ratio of 510 is larger than the ratio of 509 in the line below the line 518' at the boundary.

However, if the number of vertical lines between the LV image signal and the tracking image signals is different, the line 515' in the tracking image signals is remapped by multiplying the line 515 in the LV image signals by (the number of vertical lines of the tracking image signals/the number of vertical lines of the LV image signals). The same applies to the line 518' in the tracking image signal.

The method for creating the exposure overlap map described here is an example in Embodiment 1, and as shown in FIG. 3B, the exposure overlap map may be created by using the exposure time overlap ratio itself as the tracking image relation degree.

Figure 4:
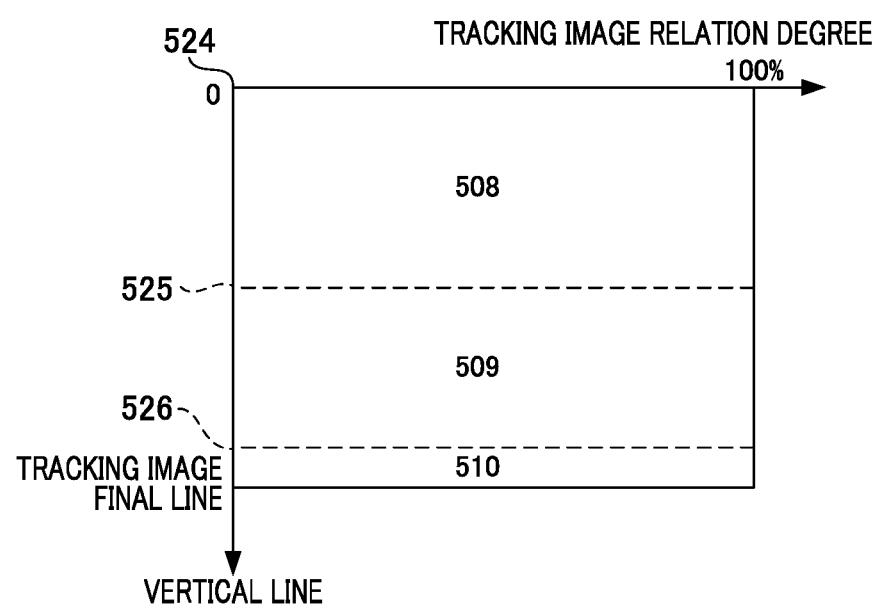
FIG. 4 illustrates the relation degree between the LV image and the tracking image for each vertical line of the tracking image in Embodiment 1.

To create the simplest exposure overlap map, there is a method for re-mapping each intersection of exposure start times 521 to 523 of the tracking image signals and the tilt 500 of the rolling shutter of the LV image signals onto the number of tracking image signal lines, and the result is shown in FIG. 4. FIG. 4 illustrates the relation degree between the LV image and the tracking image for each vertical line of the tracking image in Embodiment 1.

In FIG. 4, the exposure overlap map may be created in which the exposure times 508 to 510 having a high overlap ratio is switched to either 0% or 100% by lines 524 to 526 serving as line boundaries. Up to the line 525, the tracking image signals during the exposure time 508 have a tracking image relation degree of 100%, and from the line next to line 525 to line 526, the tracking image signals during the exposure time 509 have a tracking image relation degree of 100%.

Additionally, from the line next to the line 526, it is assumed that the tracking image signals during the exposure time 510 have a tracking image relation degree of 100%. The relation degree information generation circuit 115 may not included in the configuration of the image pickup apparatus 100, and it may serve as a relation degree generating unit that loads a program in a calculation apparatus that is different from the image pickup apparatus 100 so as to generate an exposure overlap map by executing the program. In this connection, the relation degree generating unit may be a discreet electrical circuit.

The generated exposure overlap map may be written to the memory 108 in advance, and the specific region selecting/synthesizing circuit 114 may read out the exposure overlap map from the memory 108. Thus, it is possible to reduce the calculation amount for generating the exposure overlap map in real time in the image pickup apparatus.

The specific region selecting/synthesizing circuit 114 selects a main object tracking frame indicating a main object position and a main object size based on the exposure overlap map generated by the relation degree information generation circuit 115, the main object detection information of a plurality of frames and the main object tracking information acquired by the specific region detection circuit 109. Subsequently, the main object tracking frame is synthesized with the LV image.

For example, a case in which FIG. 3A is an exposure overlap map will be described. The specific region selecting/synthesizing circuit 114 sets the exposure time 509, for which exposure centroid is the closest to the exposure centroid timing 520 of the exposure time 506 of the LV image signals from among the exposure times 508 to 510 of the tracking image in FIG. 2A, as a reference exposure image.

Subsequently, it is confirmed during which exposure time (exposure time period) of the exposure overlap map the main object centroid position included in the main object tracking information in the tracking image signals captured during the exposure time 509 is located. As the result for the confirmation, if the main object centroid position is located during the exposure time 508, the specific region selecting/synthesizing circuit 114 determines that the main object in the LV image signals has the highest relation with the tracking image signals captured during the exposure time 508.

Subsequently, the main object tracking frame (specific region) is selected or synthesized by using the main object detection information and the main object tracking information in the tracking image signals captured during the exposure time 508. Note that the present invention is not limited to the synthesis, and any predetermined image processing for the LV image signal (first image signal) may be used in place of the synthesis. As the result for the above confirmation, if the main object centroid position is located during the exposure time 509, the specific region selecting/synthesizing circuit 114 determines that the main object in the LV image signals has the highest relation with the tracking image signals captured during the exposure time 509.

Subsequently, the main object tracking frame is selected or synthesized by using the main object detection information and the main object tracking information in the tracking image signals captured during the exposure time 509. If the main object centroid position is located during the exposure time 510, the specific region selecting/synthesizing circuit 114 determines that the main object in the LV image signals has the highest relation with the tracking image signal imaged during the exposure time 510. Subsequently, the main object tracking frame is selected or synthesized by using the main object detection information and the main object tracking information in the tracking image signals captured during the exposure time 510.

As another example, the specific region selecting/synthesizing circuit 114 confirms during which exposure time in the exposure overlap map the main object centroid position included in the main object tracking information in the tracking image signals captured during the exposure time 510 is located. If the main object centroid position is located during the exposure time 510, the specific region selecting/synthesizing circuit 114 determines that the main object in the LV image signals has the highest relation with the tracking image signals captured during the exposure time 510.

The specific region selecting/synthesizing circuit 114 selects or synthesizes the main object tracking frame by using the main object detection information and the main object tracking information in the tracking image signals captured during the exposure time 510. Subsequently, it is confirmed during which exposure time in the exposure overlap map the main object centroid position included in the main object tracking information in the tracking image signal imaged during the exposure time 509 is located.

When the main object centroid position is located during the exposure time 509 of the exposure overlap map, it is determined that the main object in the LV image signal has the highest relation with the tracking image signals captured during the exposure time 509. Subsequently, the main object tracking frame is selected or synthesized by using the main object detection information and the main object tracking information in the tracking image signals captured during the exposure time 509. Subsequently, it is confirmed during which exposure time in the exposure overlap map the main object centroid position included in the main object tracking information in the tracking image signals captured during the exposure time 508 is located.

When the main object centroid position is located during the exposure time 508 of the exposure overlap map, it is determined that the main object in the LV image signal has the highest relation with the tracking image signal imaged during the exposure time 508. Subsequently, the main object tracking frame is selected or synthesized by using the main object detection information and the main object tracking information in the tracking image signal imaged during the exposure time 508.

If the main object centroid position is not located from the exposure time 508 to the exposure time 510, the main object tracking frame is selected or synthesized by using the main object detection information and the main object tracking information in the tracking image signals captured during the exposure time 509, which serve as the reference exposure image. As another example, the following will be possible. Specifically, the specific region selecting/synthesizing circuit 114 obtains an average position of the main object centroid position included in the main object tracking information in the tracking image signals captured during the exposure times 508 to 510.

Subsequently, it is confirmed at which exposure time in the exposure overlap map the average position of the main object centroid position is located. The main object tracking frame may be selected or synthesized by using any piece of the main object tracking information and any piece of one of the main object detection information in the tracking image signals captured during the exposure times 508 to 510.

Moreover, as another example, the specific region selecting/synthesizing circuit 114 sets the exposure time 509 at which the exposure centroid is the closest to the exposure centroid timing 520 of the exposure time 506 of the LV image signals, as a reference exposure image, and sets the exposure time 510 of which the exposure centroid is the second closest to the exposure centroid timing 520 as a sub-reference exposure image. Subsequently, the main object centroid position included in the main object tracking information in the tracking image signals captured during the exposure time 509 and the main object centroid position included in the main object tracking information in the tracking image signals captured during the exposure time 510 are obtained.

Subsequently, an average position obtained by performing weighting corresponding to the distance between each exposure centroid timing of the exposure times 509 and 510 and the exposure centroid timing 520 of the exposure time 506 of the LV image signal is obtained for each of these main object centroid positions. It is confirmed during which exposure time in the exposure overlap map the weighting average position of the centroid of the main object is located. It may be possible to determine which main object tracking information and which main object detection information in the tracking image signals captured during the exposure times 508 to 510 is to be used for selecting or synthesizing the main object tracking frame.

The specific region selecting/synthesizing circuit 114 obtains the average position of the main object centroid positions included in the main object tracking information in the tracking image signals captured during the exposure times 508 to 510 and confirms during which exposure time in the exposure overlap map the average position of the main object centroid positions is located. In this case, a total distance value with the average position of the main object centroid position is obtained, an enlargement factor of the main object tracking frame corresponding to the total distance value is set, and the enlargement factor is multiplied by the main object tracking frame selected or synthesized by the specific region selecting/synthesizing circuit 114 to enlarge the main object tracking frame.

As a result, the function for increasing the frequency of keeping the main object inside the tracking frame is provided by further enlarging the tracking frame when the main object moves significantly during the exposure times 508, 509, and 510. Moreover, as another example, the specific region selecting/synthesizing circuit 114 uses the exposure overlap map shown in FIG. 3B.

The tracking image signals captured during the exposure time 509 are set as a reference exposure image, and it is confirmed at which vertical line of the exposure overlap map the main object centroid position included in the main object tracking information in the tracking image signal captured during the exposure time 509 is located. Based on the exposure time overlap ratio in the vertical line, the weighting of the overlap ratio may be performed for the main object tracking information and the main object detection information in the tracking image signals captured during the exposure times 508 to 510 or the main object tracking frame may be synthesized.

The case in which the overlap ratio with the exposure time 508 is 40% and the overlap ratio with the exposure time 509 is 60% will be considered. The specific region position information of the main object detection information in the tracking image signals captured during the exposure time 508 is denoted by (x1, y1), the specific region size information is denoted by (s1), and the specific region position information of the main object detection information in the tracking image signals captured during the exposure time 509 is denoted by (x2, y2).

When the specific region size information is denoted by (s2), the position information (x3, y3) and the size information (s3) of the main object tracking frame can be obtained by the following formulae:

$$x3=0.4 \times x1+0.6 \times x2$$

$$y3=0.4 \times y1+0.6 \times y2$$

$$s3=0.4 \times s1+0.6 \times s2$$

Figure 5B:
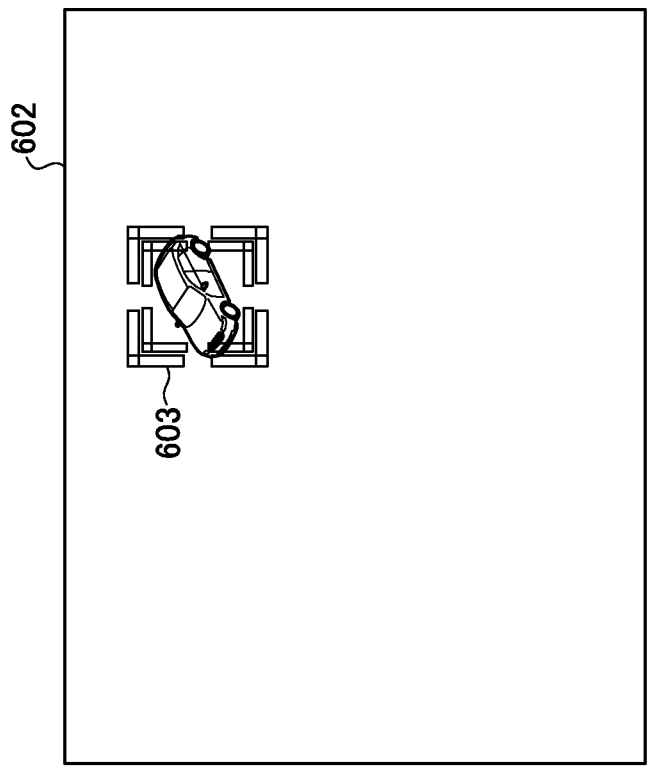
FIG. 5B is a view in which a main object tracking frame is overlapped to generate a display image with a tracking frame.
Figure 5A:
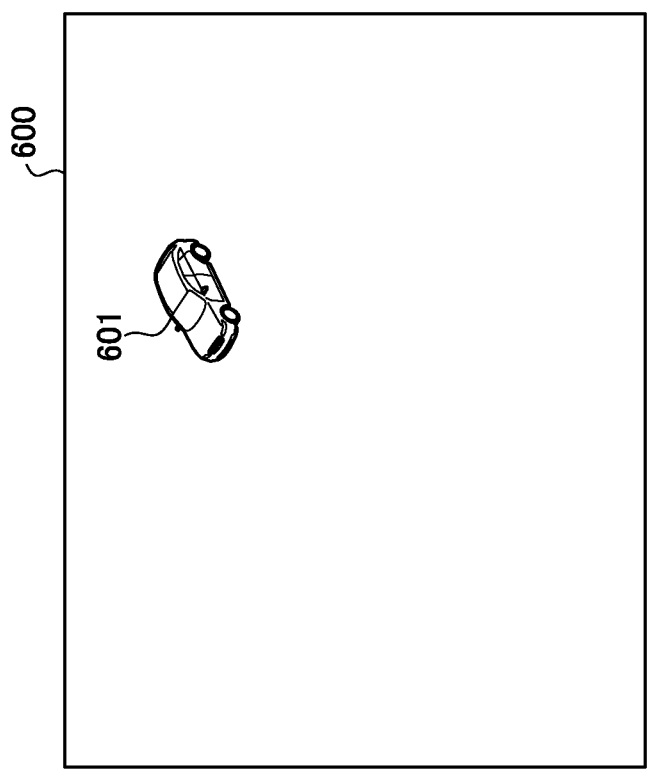
FIG. 5A illustrates a display image and a display image with a tracking frame in Embodiment 1.

The specific region overlapping circuit 117 overlaps the main object tracking frame selected or synthesized by the specific region selecting/synthesizing circuit 114 on the display image converted by the display image post-processor 113, and outputs it to the display device 119 as a display image with a tracking frame. FIG. 5 illustrates a display image and a display image with a tracking frame in Embodiment 1. As shown in FIG. 5A, a main object tracking frame 603 is overlapped on a main object 601 of a display image 600 as shown in FIG. 5B to generate a display image-with-tracking frame 602.

Figure 6:
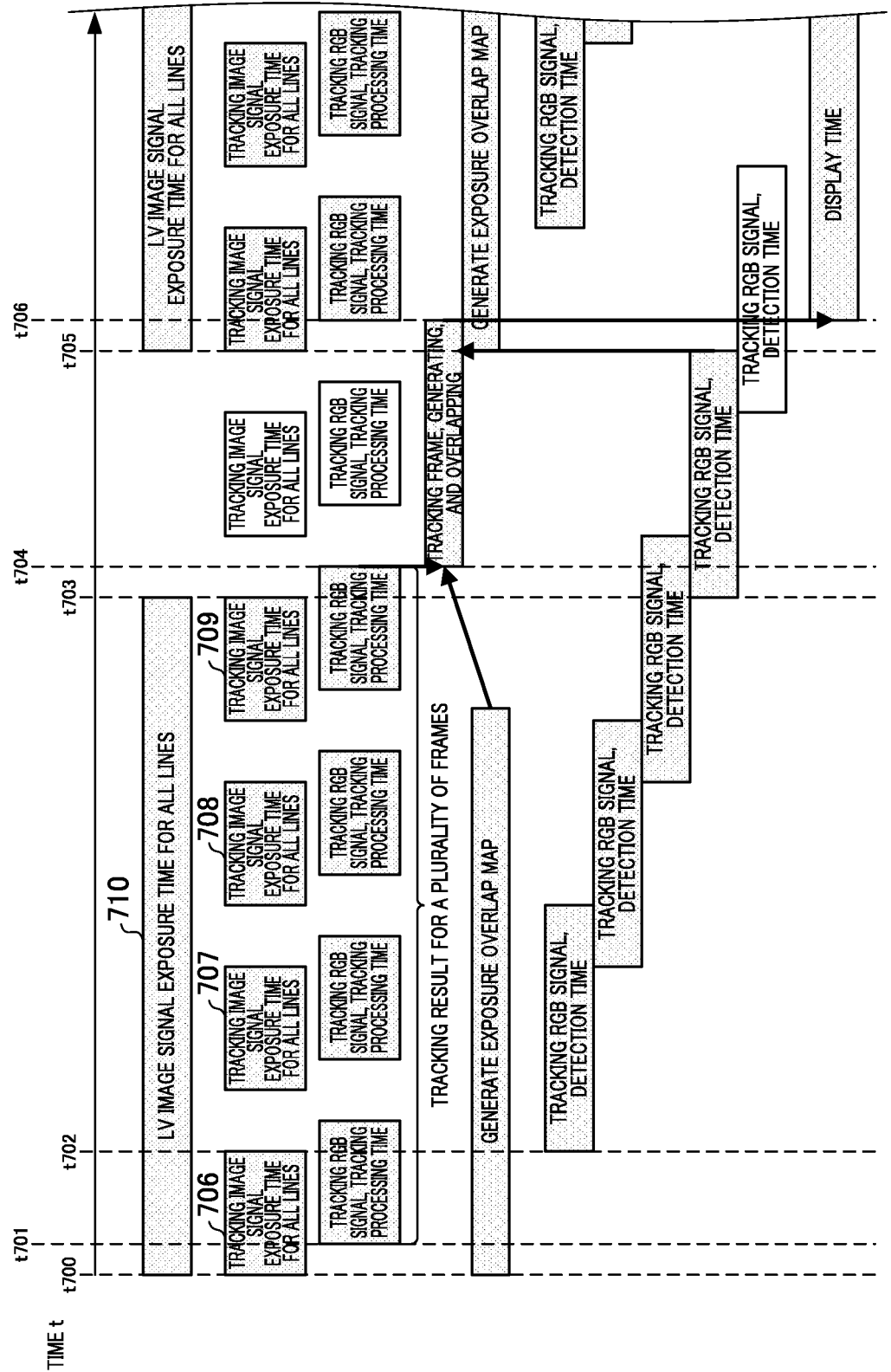
FIG. 6 is a timing diagram of a case in which the overlapping of the main object tracking frame using the detection processing result in Embodiment 1 is completely in time for display.
Figure 7:
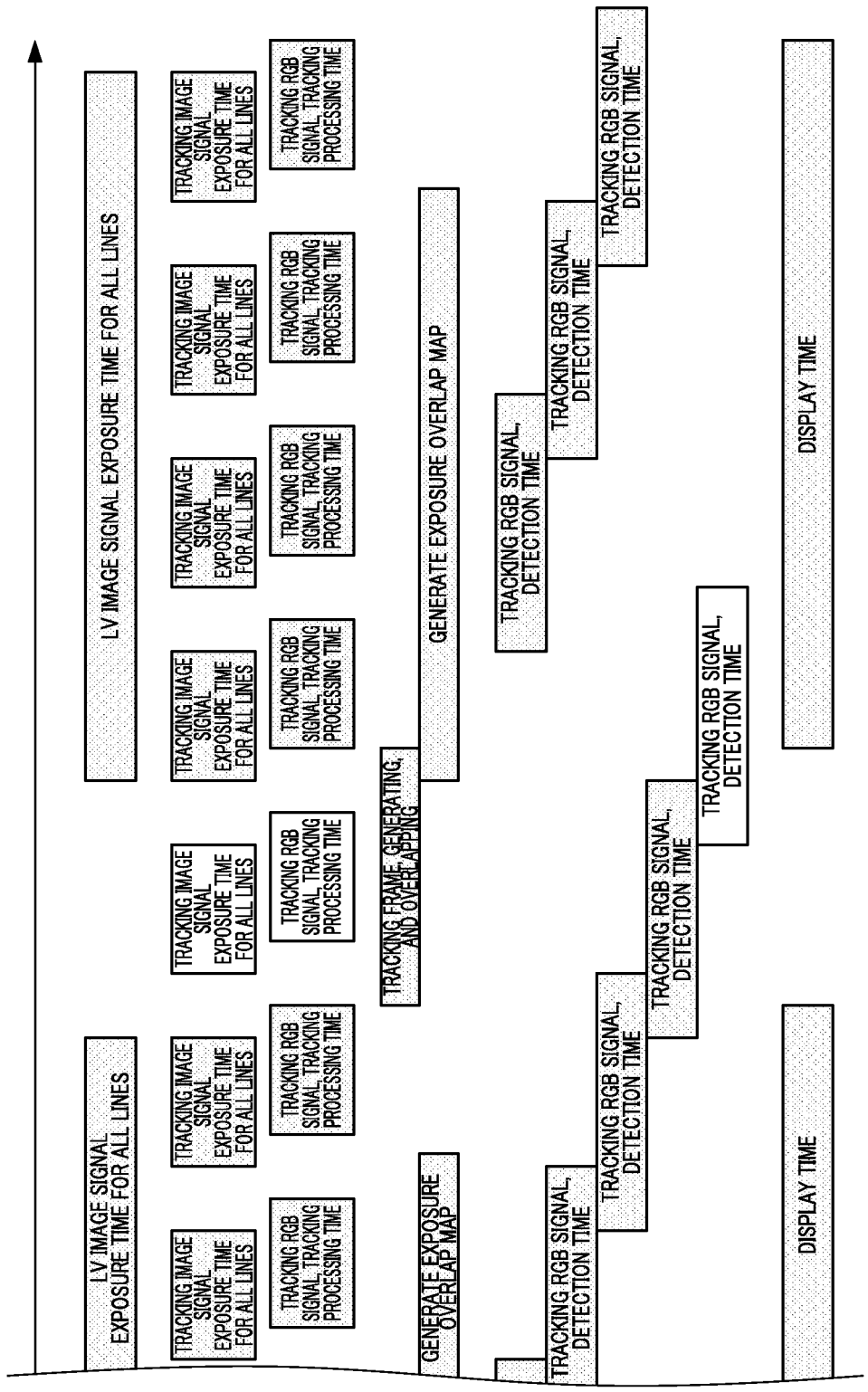
FIG. 7 is a timing diagram of a case in which the overlapping of the main object tracking frame using the detection processing result in Embodiment 1 is completely in time for display.

FIG. 6 and FIG. 7 are timing diagrams of a case in which the overlapping of the main object tracking frame using the detection processing result in Embodiment 1 is in time for display. In FIG. 6 and FIG. 7, the main object tracking frame that is generated based on the main object detection information detected from tracking image signals 706 to 709 of which exposure time overlaps exposure times t700 to t703 of the LV image signals is in time for overlap on the display image.

Specifically, a time obtained by adding the tracking frame generation processing and the overlapping processing of the tracking frame on the display image to an output timing t705 of the main object detection information detected by using the tracking image signal 709 is in time for a display start time t706 for starting the display of LV image signals 710. In this case, the main object tracking frame generated based on the main object detection information is overlapped on the display image.

Figure 8:
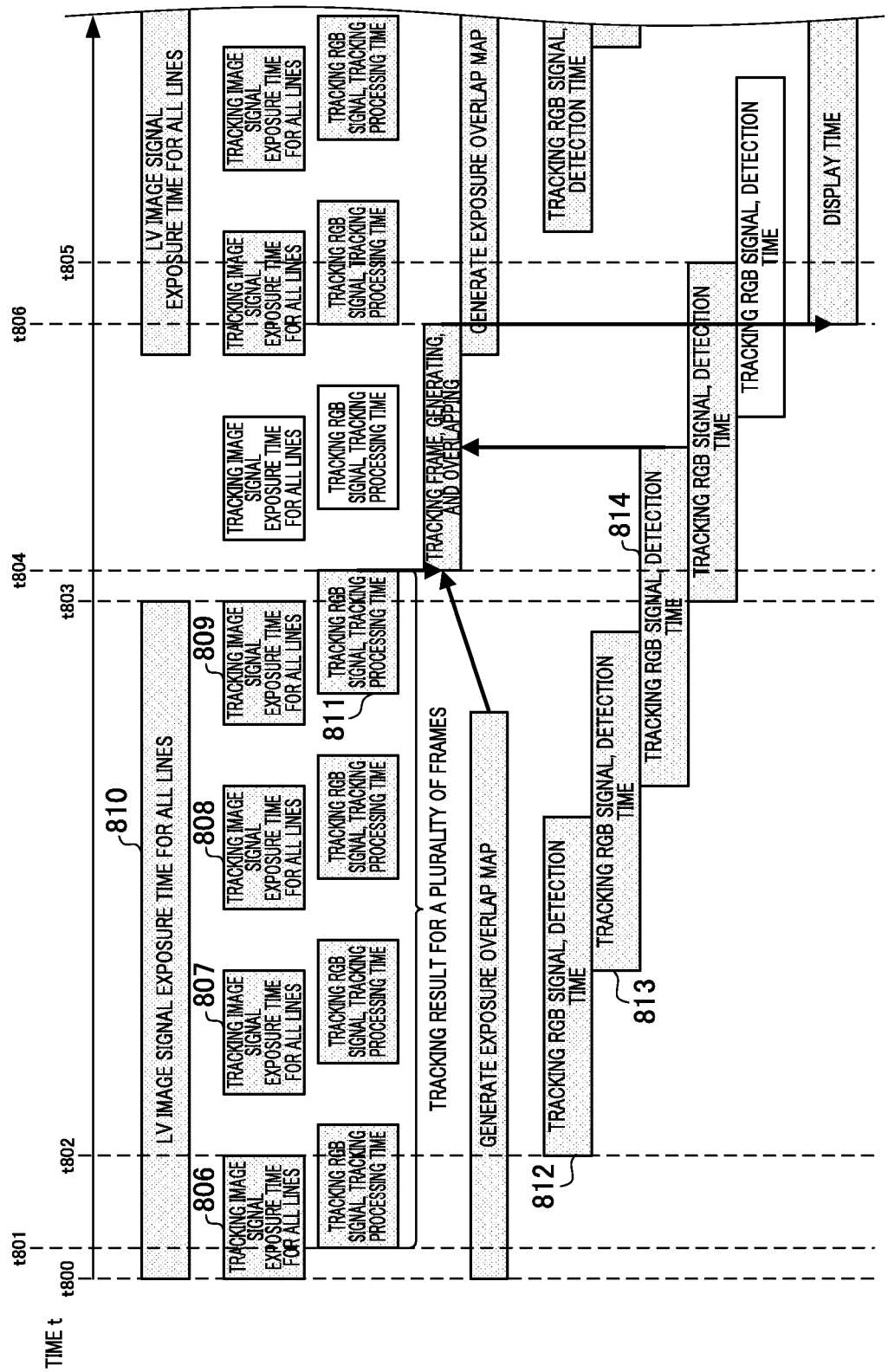
FIG. 8 is a timing diagram of a case in which the overlapping of the main object tracking frame using the detection processing result in Embodiment 1 is not in time for display in some frames.
Figure 9:
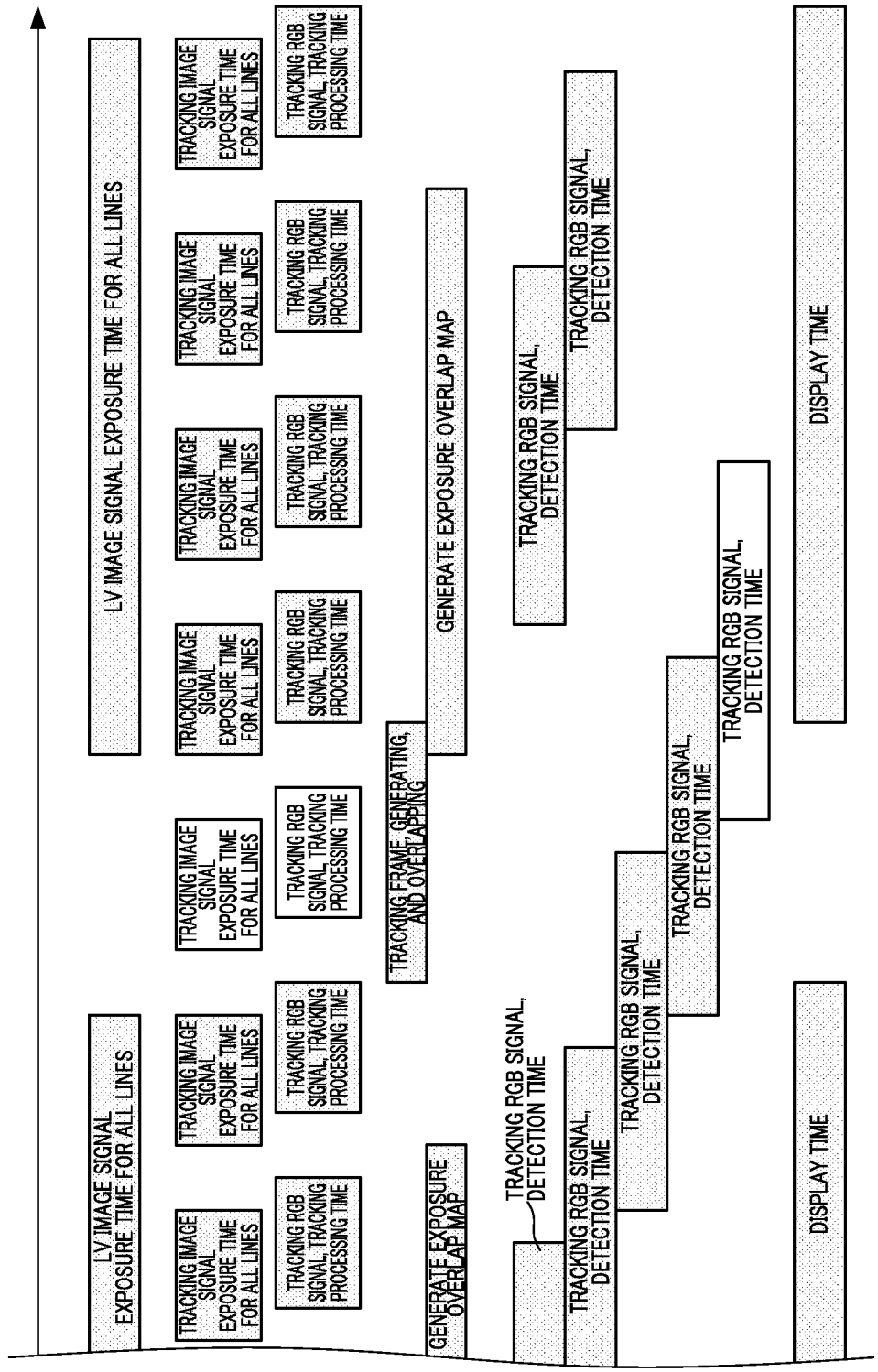
FIG. 9 is a timing diagram of a case in which overlapping of the main object tracking frame using the detection processing result in Embodiment 1 is not in time for display in some frames.

In contrast, FIG. 8 and FIG. 9 are timing diagrams illustrating a case in which the overlapping of the main object tracking frame using the detection processing result in Embodiment 1 is not in time for display in some frames. In FIG. 8 and FIG. 9, the main object tracking frame generated based on the main object detection information detected from tracking image signals 806 to 809 for which exposure times overlap with the exposure times t800 to t803 of the LV image signals is not in time for overlap on the display image.

Specifically, the time that is obtained by adding the tracking frame generation processing and the overlapping processing of the tracking frame on the display image to the output timing t805 of the main object detection information detected by using the tracking image signal 809 is not in time for the display start time t806 for starting the display of an LV image signal 810. In this case, the main object tracking frame is generated by using main object detection information 812, 813, and 814 and a main object tracking information 811, which can be in time for the display start time t806, and is overlapped on the display image.

Figure 10:
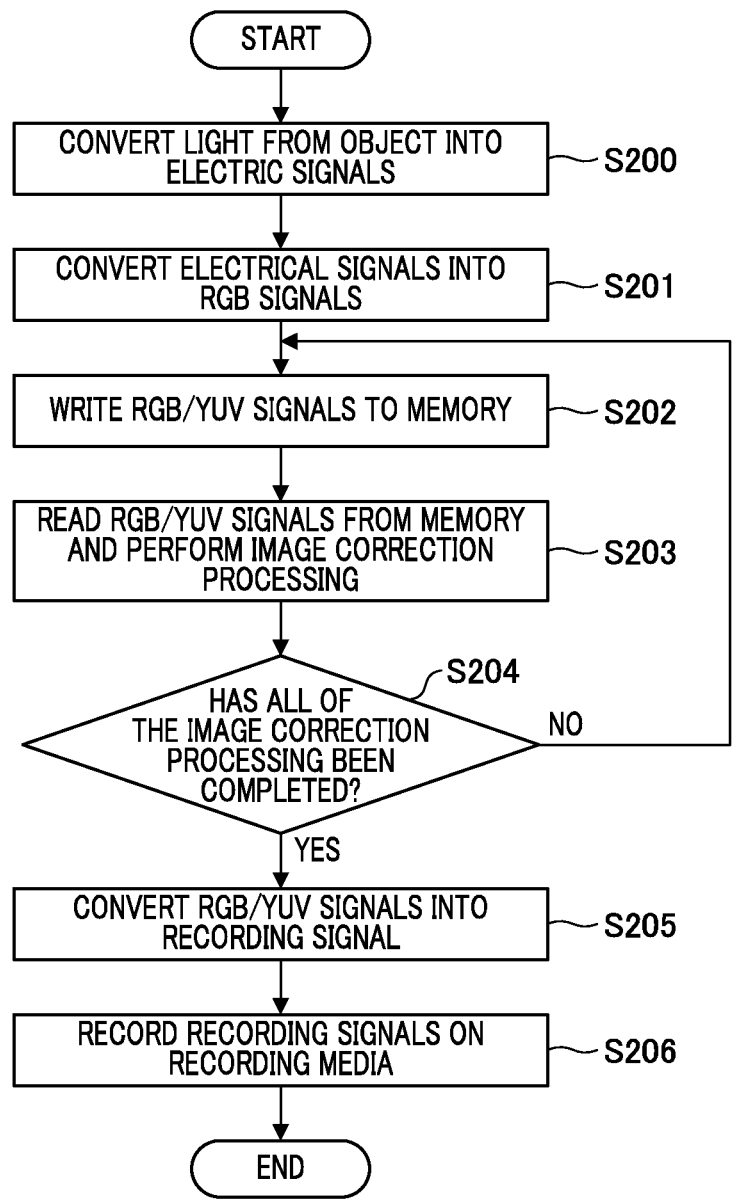
FIG. 10 is a flowchart illustrating a flow of the recording processing of the LV image signal of the image pickup apparatus according to Embodiment 1.

Specifically, when the original main object tracking frame is not in time for display, another main object tracking frame that can be displayed in time is displayed. FIG. 10 is a flowchart that illustrates a flow of the recording processing of the LV image signals of the image pickup apparatus 100 according to Embodiment 1.

The image pickup element 103 receives optical signals from the object via the optical system 101 for which the focus has been adjusted by the optical controller 102, and converts the optical signals into LV image signals, which are electric signals (S200). The display image pre-processor 104 converts the LV image signals converted by the image pickup element 103 into signals of each RGB color (S201). The LVRGB signals are sequentially output to the image correction circuit 106 from the upper left to the lower right of the screen for each line.

The display image data controller 107 of the image correction circuit 106 writes the RGB signals acquired from the display image pre-processor 104 or the RGB signal/YUV signal produced by the image correction circuit 106 that performs the image correction processing to the memory 108 (S202). The display image data controller 107 of the image correction circuit 106 reads out the RGB signal/YUV signal written to the memory 108 in step S202, and performs image correction processing (S203).

The number of lines to be read out differs depending on the image processing performed by the image correction circuit 106. For image processing for one line, there are cases in which the RGB signals for one line are read out or the RGB signals for a plurality of lines are read out. Additionally, the present invention may be configured so as to execute various types of readout processing, including dividing an image into rectangular areas and reading out the image in units of the rectangular areas.

If all of the necessary image correction processing has not been completed by the image correction circuit 106, the process returns to the process of step S202 ("NO" in S204). If all of the necessary image correction processing has been completed, the RGB signal/YUV signal produced by the image correction processing are output to the display image post-processor 113 ("YES" in S204).

The display image post-processor 113 converts the RGB signal/YUV signal acquired from the image correction circuit 106 and produced by the image correction processing into recording signals for recording on a recording medium (S205). The recording device 116 writes the recording image acquired from the display image post-processor 113 to the recording medium 118 (S206).

Figure 11:
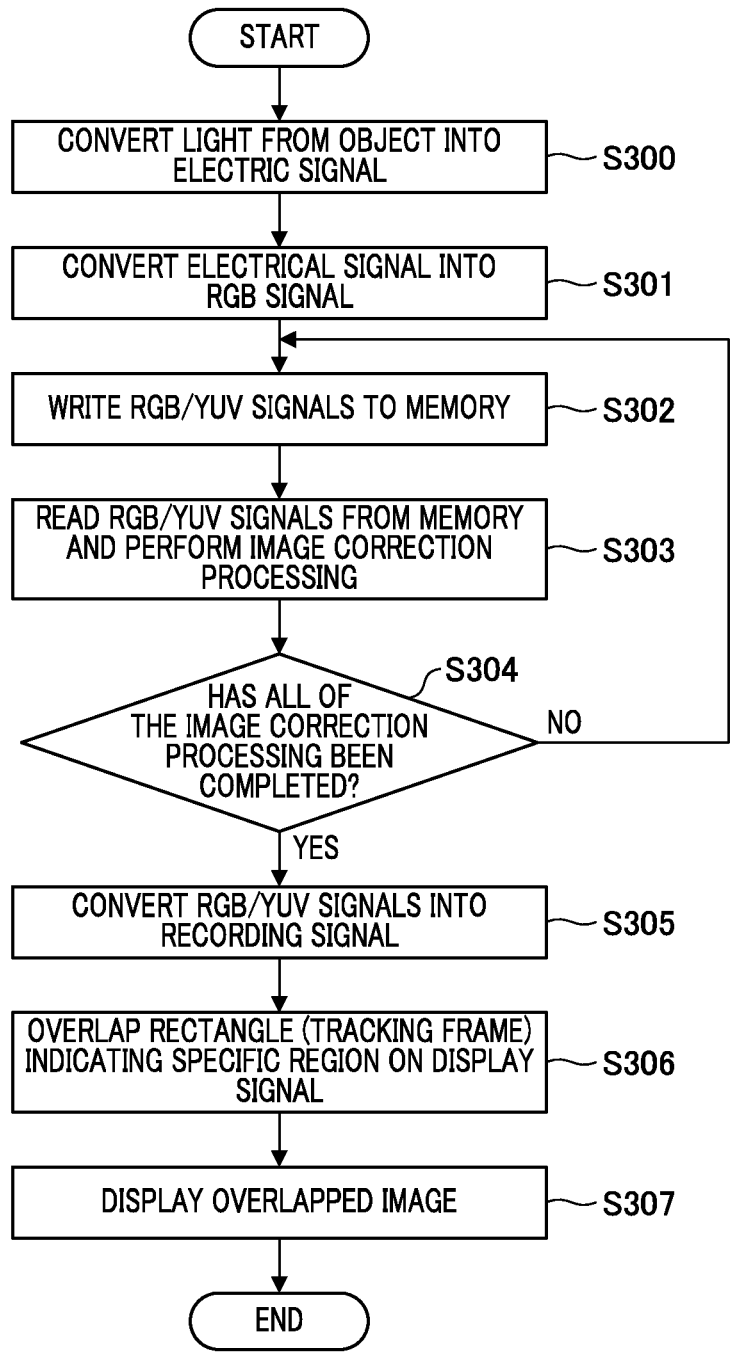
FIG. 11 is a flowchart illustrating a flow of the display processing of the LV image signal of the image pickup apparatus in Embodiment 1.

FIG. 11 is a flowchart that illustrates a flow of the display process of the LV image signals of the image pickup apparatus 100 according to Embodiment 1. The processes in steps S300, S301, S302, S303, and S304 are the same as those in steps S200, S201, S202, S203, and S204, and their description will be omitted.

The display image post-processor 113 converts the RGB signal/YUV signal acquired from the image correction circuit 106 and produced by the image correction processing into display image signals (S305). The display image signals are supplied to the specific region overlapping circuit 117.

The specific region overlapping circuit 117 overlaps a rectangular frame (main object tracking frame) selected or synthesized by the specific region selecting/synthesizing circuit 114 on the display image signals that have been acquired from the display image post-processor 113 (S306). The rectangular frame (main object tracking frame) is a frame indicating a specific region that is the minimum rectangular region including a main object included in the display image signal.

The display signals on which the main object tracking frame is overlapped are supplied to the display device 119, and the display device 119 displays the display signals in which the main object tracking frame that has been acquired from the specific region overlapping circuit 117 is overlapped in a format that allows the photographer to view it (S307).

Figure 12:
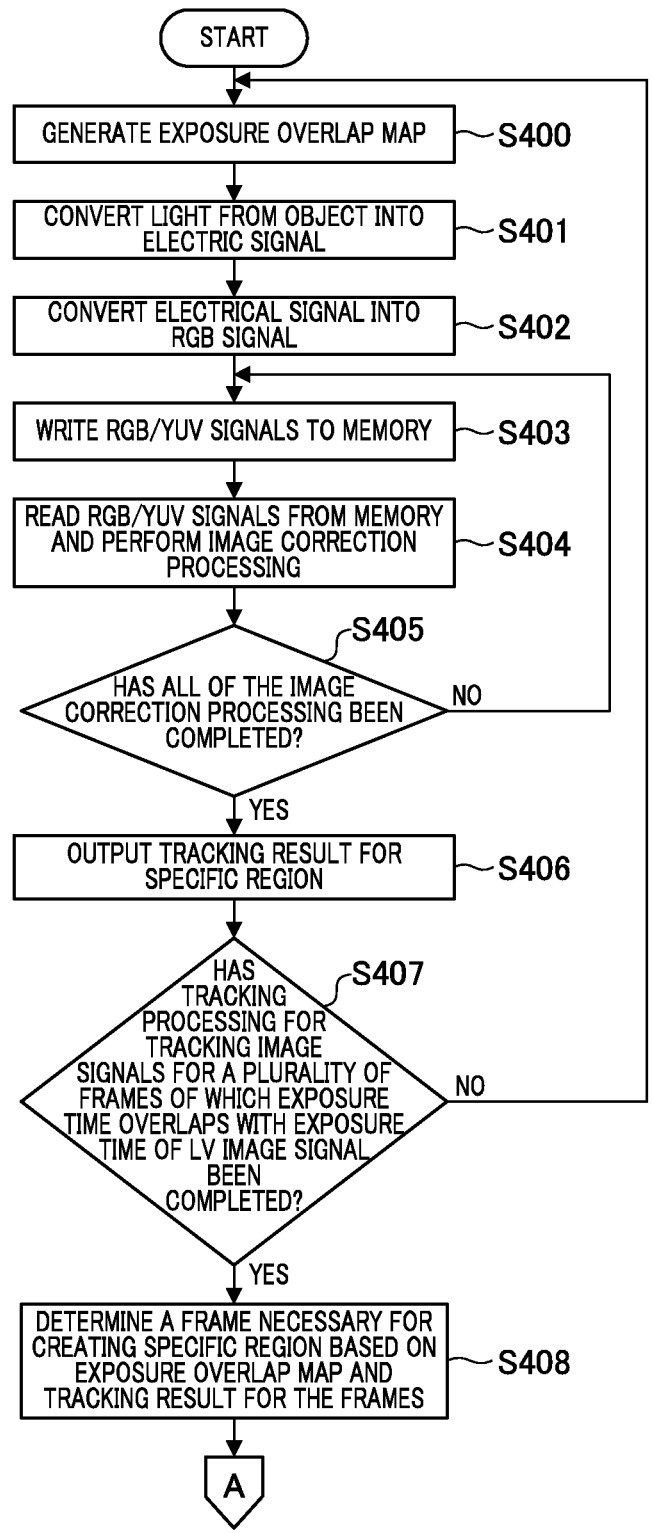
FIG. 12 is a flowchart illustrating a flow of the process of overlapping the main object tracking frame of the tracking image signal of the image pickup apparatus according to Embodiment 1.
Figure 13:
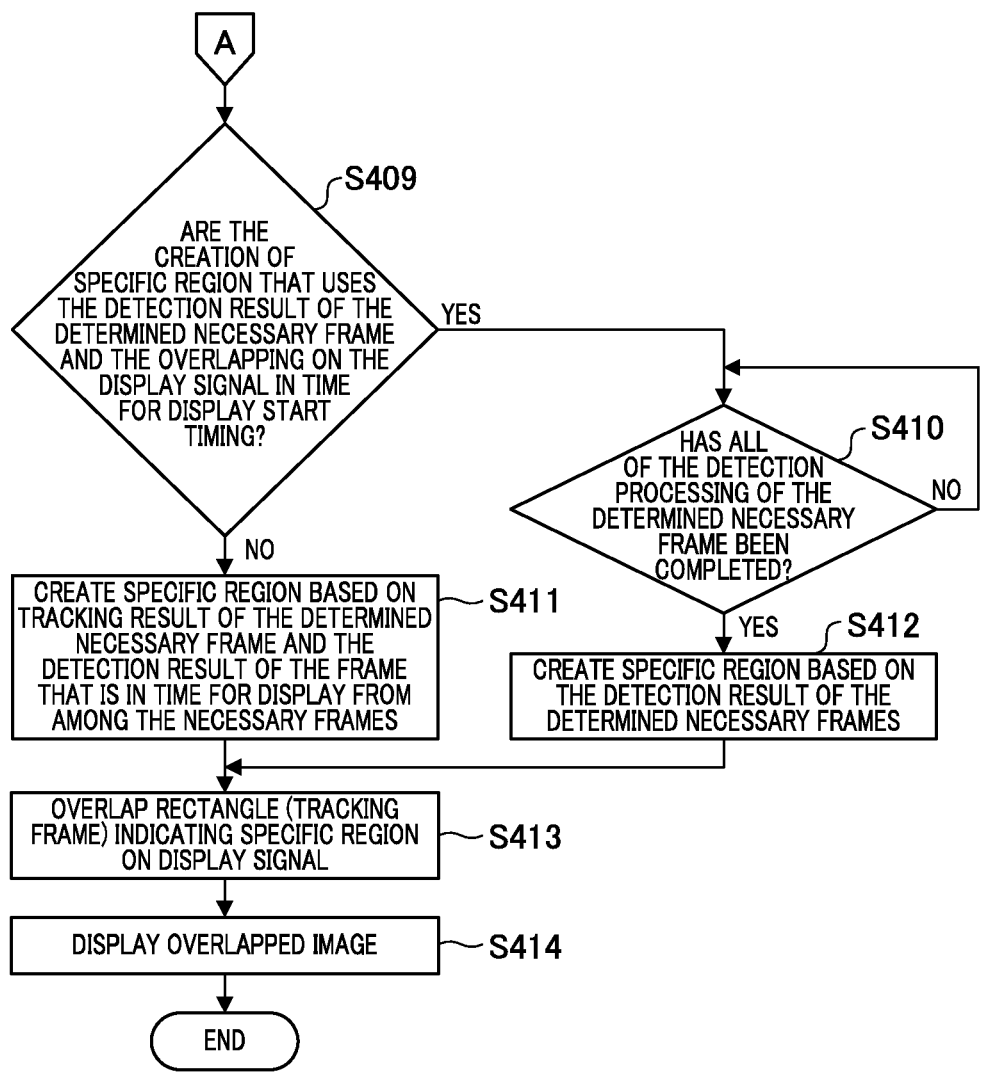
FIG. 13 is a flowchart illustrating a flow of the process of overlapping the main object tracking frame of the tracking image signal of the image pickup apparatus according to Embodiment 1.

FIG. 12 and FIG. 13 are flowcharts that illustrate the flow of the process of overlapping the main object tracking frame of the tracking image signals of the image pickup apparatus 100 according to Embodiment 1. The relation degree information generation circuit 115 generates an exposure overlap map based on the exposure start timing and exposure time of the LV image signals and the exposure start timing and exposure time of each of the tracking image signals for a plurality of frames having different exposure start timings in the image pickup element 103 (S400). The relation degree between the LV image signals for one frame and the tracking image signals for a plurality of frames is indicated in the exposure overlap map.

The exposure overlap map is output to the specific region selecting/synthesizing circuit 114. When the imaging cycle of the LV image signal for one frame is synchronized with the imaging cycle of the tracking image signals of a plurality of frames, the exposure overlap map generated once is repeatedly used a plurality of times to generate the exposure overlap map. When the imaging cycle of the LV image signal for one frame is not synchronized with the imaging cycle of the tracking image signal for a plurality of frames, the exposure overlap map is generated every time the LV image signals for one frame is captured. The processes in steps S401, S402, S403, S404, and S405 are the same as those in steps S200, S201, S202, S203, and S204, and their description will be omitted.

When "YES" in step 405, the image tracking circuit 112 acquires the RGB signal/YUV signal for which all of the necessary image correction processing has been completed. Subsequently, the feature information of the main object stored in the memory 108 by the detection processing of the past frame in the image detection circuit 111 is acquired through the detection and racking image data controller 110. Subsequently, tracking processing for the specific region is performed based on the acquired feature information (S406).

In step S406, the main object tracking information about tracking of the specific region is output to the specific region selecting/synthesizing circuit 114. Additionally, the image detection circuit 111 acquires the RGB signal/YUV signal for which all of the necessary image correction processing has been completed by "YES" in step S405, and starts the detection processing for the specific region that is the main object region. The main object detection information about detection of the specific region is output to the specific region selecting/synthesizing circuit 114.

In step S406, the image detection circuit 111 outputs the feature information of the main object represented by edge information and histogram information to the memory 108 through the detection and tracking image data controller 110. Since the detection processing takes a longer time than the tracking processing, the process is transitioned to step S407 by using the completion of the tracking processing as a trigger.

If all of the tracking processing of the tracking image signals for a plurality of frames for which the exposure time overlaps with the exposure time of the LV image signal has not been completed from the exposure overlap map acquired from the relation degree information generation circuit 115, the process returns to step S400 in the next frame ("NO" in S407). If all of the tracking processing has been completed, the process proceeds to step S408 ("YES" in S407).

The specific region selecting/synthesizing circuit 114 determines a frame necessary for selecting or synthesizing one specific region based on the exposure overlap map that has been acquired from the relation degree information generation circuit 115 and the main object tracking information for a plurality of frames that has been acquired from the image tracking circuit 112 (S408). It is assumed in the exposure overlap map shown in FIG. 3A that, for example, the average position of the main object centroid position in the main object tracking information of the tracking image signals captured during the exposure times 508 to 510 is a line position higher than 515'.

In this case, the main object in the LV image signal is determined to have the highest relation with the tracking image signals captured during the exposure time 508, and the frame of the exposure time 508 is determined as the necessary frame. When the exposure overlap map is the one shown in FIG. 3B, the necessary frames determined by the main object centroid position are two frames.

The image detection circuit 111 performs the detection processing of the specific region by using the RGB signal/YUV signal converted from the tracking image signals of the necessary frame determined in the process of step S408. The specific region selecting/synthesizing circuit 114 creates a main object tracking frame based on the main object detection information output by the image detection circuit 111.

If the timing for completing the process of overlapping the main object tracking frame on the display signal is in time for the display start timing of the display signal in the display device 119, the process proceeds to step S410 ("YES" in S409). If the timing is not in time for the display start timing of the display signals, the process proceeds to step S411 ("NO" in S409).

In step S411, when the number of necessary frames determined in step S408 is one frame, the specific region selecting/synthesizing circuit 114 selects the main object tracking information of the frame. Subsequently, the specific region selecting/synthesizing circuit 114 creates a main object tracking frame based on the specific region position, the specific region size, and the main object centroid position of the selected main object tracking information.

When the necessary frame determined in step S408 is a plurality of frames, the specific region selecting/synthesizing circuit 114 selects the main object detection information of the frame in time for the display start timing and the main object tracking information of the frame that is not in time from among the plurality of necessary frames. Subsequently, it creates a main object tracking frame based on the selected main object detection information and the specific region position, specific region size, and the main object centroid position of the main object tracking information (S411). The created main object tracking frame is output to the specific region overlapping circuit 117.

The process proceeds to the process of S412 when the detection processing of all the necessary frames determined in S408 by the image detection circuit 111 is completed, and the main object detection information of all the necessary frames is acquired as the processing of S410 ("YES" in S410). If the acquisition of the main object detection information for the necessary frames has not been completed, the process of step S410 is repeated until the acquisition is completed ("NO" in S410).

When the necessary frame determined in step S408 is one frame, the specific region selecting/synthesizing circuit 114 selects the main object detection information of the corresponding frame and creates a main object tracking frame based on the specific region position, the specific region size, and the main object centroid position of the selected main object detection information (S412). When the necessary frames determined in step S408 are the plurality of frames, the specific region selecting/synthesizing circuit 114 synthesizes the main object tracking frame based on the specific region position, the specific region size, and the main object centroid position in the main object detection information of the plurality of frames (S412). The created main object tracking frame is output to the specific region overlapping circuit 117.

The specific region overlapping circuit 117 overlaps a rectangle (main object tracking frame) indicating the specific region, which is the smallest rectangular region including the main object included in the display signals acquired from the specific region selecting/synthesizing circuit 114 on the display signal acquired from the display image post-processor 113 (S413). The display signals in which the main object tracking frame is overlapped is output to the display device 119. The display device 119 displays the display signal in which the main object tracking frame that has been acquired from the specific region overlapping circuit 117 is overlapped in a format that allows the photographer to view it (S414).

As described above, the image pickup apparatus 100 according to Embodiment 1 acquires the main object position information produced by the detection processing and the tracking processing from the tracking image signals for a plurality of frames having different exposure start timings. Based on the main object position information and the exposure overlap map indicating the relation degree between the LV image signals and the tracking image signals, tracking image signals captured during an optimum exposure time are selected.

Subsequently, the main object tracking frame generated based on the selected tracking image signals is overlapped on the main object on the display image displayed by the display device 119. Thus, positional deviation between the main object and the main object tracking frame caused by the motion of the main object can be suppressed to allow the photographer to recognize the main object easily and accurately. The frame to be overlapped and displayed is not limited to the tracking frame. For example, predetermined frames such as an icon may be overlapped and displayed.

Embodiment 2

Next, Embodiment 2 will be described. An image pickup apparatus 900 according to Embodiment 2 performs lens defocusing amount calculation processing for an object region from the LV image by using the object region generated based on the tracking image signal. Additionally, a tracking pickup element and a display image pickup element are separately provided.

Figure 14:
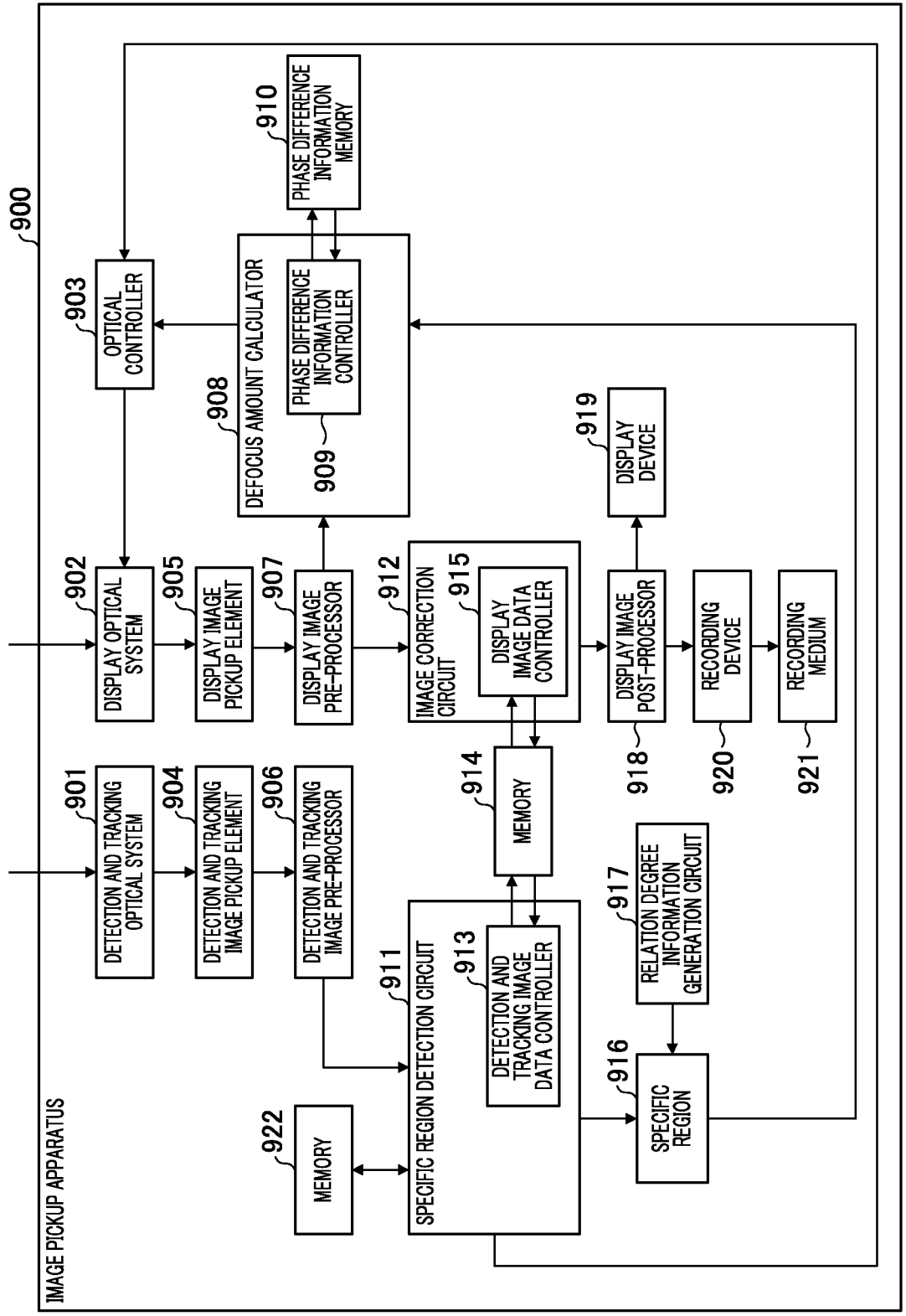
FIG. 14 is a block diagram of the image pickup apparatus according to Embodiment 2.

FIG. 14 is a block diagram schematically illustrating the internal structure of the image pickup apparatus 900 according to Embodiment 2. The image pickup apparatus 900 has a detection and tracking optical system 901, a display optical system 902, an optical controller 903, a detection and tracking image pickup element 904, a display image pickup element 905, a detection and tracking image pre-processor 906, a display image pre-processor 907, and a defocus amount calculator 908.

The image pickup apparatus 900 also has a phase difference information memory 910, a specific region detection circuit 911, a main memory 914, an image correction circuit 912, a specific region selecting/synthesizing circuit 916, a relation degree information generation circuit 917, a display image post-processor 918, a display device 919, a recording device 920, and a recording medium 921. The detection and tracking optical system 901 is an optical system having a fixed focal length and including a plurality of lenses, has a focal length shorter than that of the display optical system 902, and forms and acquires optical information from an object within a wide angle range.

Figure 15B:
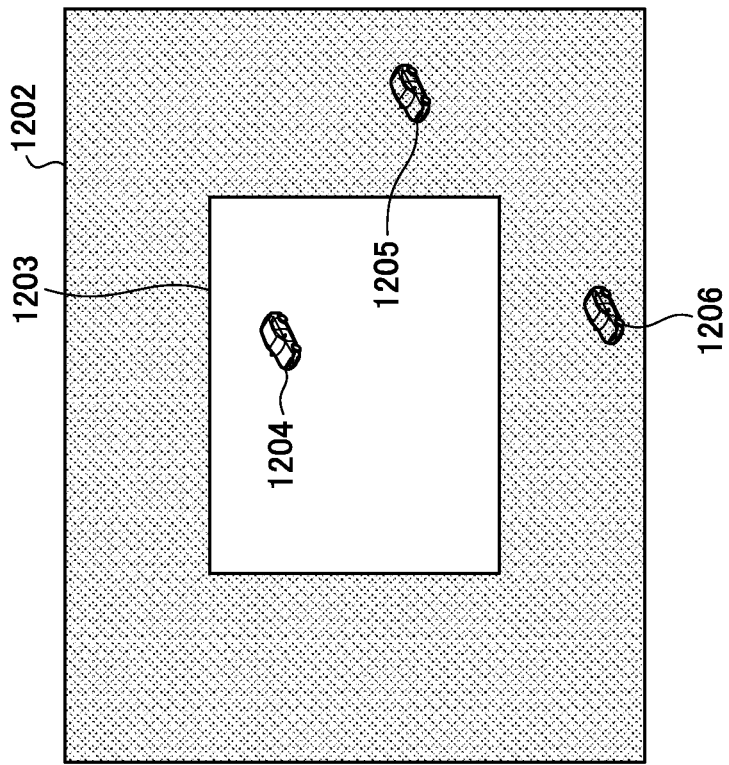
FIG. 15B illustrates the relation between the angle-of-view of the tracking image signal and the angle-of-view of the LV image signal.
Figure 15A:
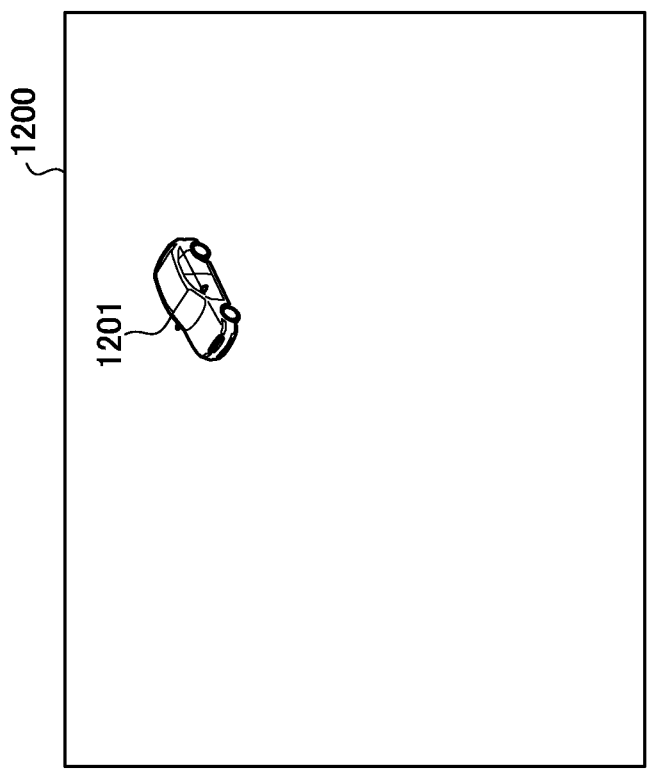
FIG. 15A illustrates a difference in the angle-of-view between the LV image and the tracking image in Embodiment 2.

FIG. 15 illustrates a difference in angle-of-view between the LV image and the tracking image in Embodiment 2. An LV image signal angle-of-view 1200 in FIG. 15A captured by the display image pickup element 905 through the display optical system 902 corresponds to an angle-of-view 1203 on a tracking image signal angle-of-view 1202 in FIG. 15B imaged by the detection and tracking image pickup element 904 through the detection and tracking optical system 901. A main object 1201 on the LV image signal in FIG. 15A corresponds to a main object 1204 on the tracking image signal angle-of-view 1202 in FIG. 15B.

Objects 1205 and 1206 in FIG. 15B are located in a range that cannot be imaged at the LV image signal angle-of-view 1200. The information about these objects is used to provide a notification to the photographer about the possibility that, for example, the object(s) enters the angle-of-view 1203 after the next frame as the result for calculating a motion vector of the object.

The detection and tracking image pickup element 904 is, for example, a CMOS image sensor, performs the imaging processing at an imaging cycle and imaging start timing different from those of the display image pickup element 905, and converts the optical information formed by the detection and tracking optical system 901 into electrical signals.

Since the display optical system 902 is the same as the optical system 101 described in Embodiment 1, the description thereof will be omitted. The display image pickup element 905 has a normal image pickup function, and is provided with partial light shielding parts symmetrical to each pair of pixels, in which two pixels arranged in the horizontal direction serve as one pair, with respect to a specific plurality of pixels (phase difference detection pixels) arranged discretely on the display image pickup element 905.

The display optical system 902 is configured to generate image signals having a phase difference (phase difference image signals) by the pair of the two pixels, and to calculate a lens defocusing amount for each rectangular region of a part of the image pickup plane by using the phase difference image signals.

It is configured to perform what is referred to as "image plane phase difference autofocusing" by performing lens control based on the lens defocusing amount. The display image pickup element 905 is configured to output each of the phase difference image signals generated by the phase difference detection pixel and the LV image signals acquired from the normal pixel.

The detection and tracking image pre-processor 906 performs the process in the same manner as the detection and tracking image pre-processor 105 described in Embodiment 1. The specific region detection circuit 911 has a detection and tracking image data controller 913 that performs the process of the image detection circuit 111 described in Embodiment 1.

Similar to the process of the image detection circuit 111, the object is detected based on the tracking RGB signals or the YUV signals produced by converting the tracking RGB signals. A main object is determined from the detected one or more objects, and the feature information of the determined main object is stored in the main memory 914 through the detection and tracking image data controller 913.

The specific region detection circuit 911 includes a CPU serving as a computer therein, and functions as a control unit that executes various operations of the entire apparatus based on a computer program stored in a memory 922. The specific region detection circuit 911 calculates the size and the centroid position of the main object based on the determined main object, and outputs the minimum rectangular region including the main object to serve as the specific region and outputs the specific region position information, the specific region size information, and the main object centroid position information to serve as the main object detection information.

The specific region detection circuit 911 serves only the inside of the angle-of-view 1203 of the LV image signals in the tracking image signal angle-of-view 1202 shown in FIG. 15B as a detection target region. Thus, a mode for reducing a calculation amount of the detection processing and a mode that serves a region including the outside the angle-of-view 1203 of the LV image signals as the detection target region are optionally switched.

Figure 16:
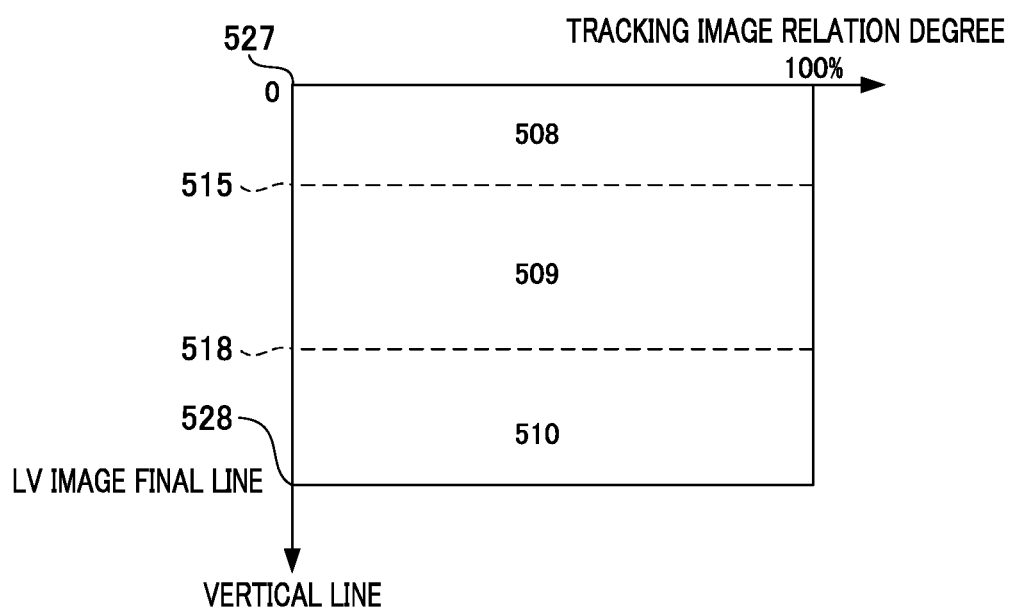
FIG. 16 illustrates a relation degree between the LV image and the tracking image for each vertical line of the LV image in Embodiment 2.

The relation degree information generation circuit 917 performs a process that is the same as the relation degree information generation circuit 115 described in Embodiment 1. FIG. 16 illustrates an exposure overlap map indicating a tracking image relation degree for each vertical line in the LV image. Since the imaging angle-of-view is different between the LV image signals and the tracking image signals in the image pickup apparatus 900, when the LV image vertical line shown in FIG. 16 is remapped to the tracking image vertical line, mapping is performed that takes the difference in angle-of-view into consideration.

Figure 17:
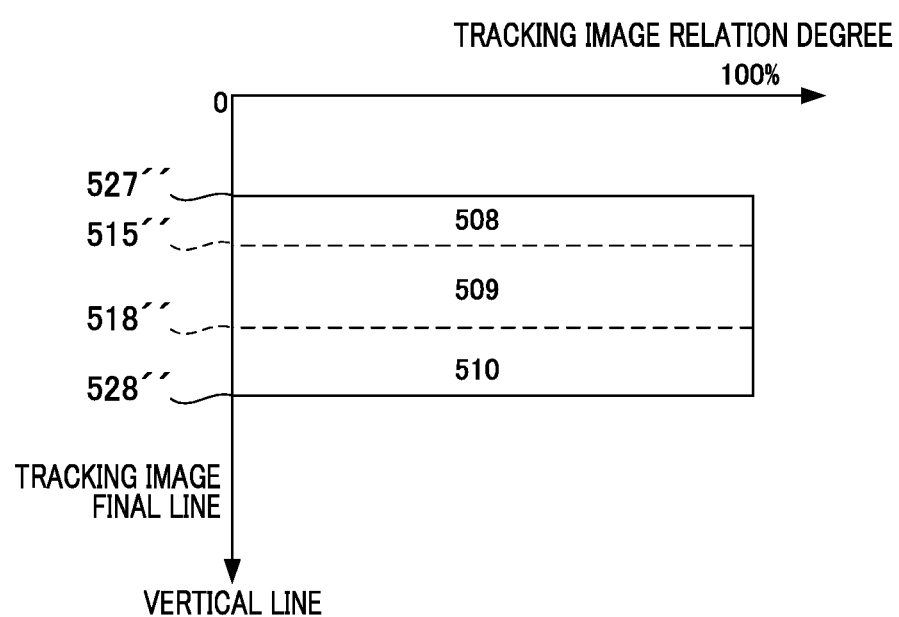
FIG. 17 illustrates a relation degree between the LV image and the tracking image for each vertical line of the tracking image in Embodiment 2.

FIG. 17 illustrates the exposure overlap map after remapping. FIG. 17 illustrates the relation degree between the LV image and the tracking image for each tracking image vertical line in Embodiment 2, and a vertical line 527" in FIG. 17 is a line produced by mapping that takes into consideration the angle-of-view with respect to a leading line 527 in FIG. 16. Additionally, a vertical line 528" in FIG. 17 is a line produced by mapping that takes into consideration the angle-of-view with respect to a final line 528 in FIG. 16.

Similarly, 515" is the line produced by mapping with respect to the vertical line 515 in FIG. 16, and 518" is the line produced by mapping with respect to the vertical line 518 in FIG. 16. The regions shown by the exposure times 508, 509, and 510 in FIG. 17 show at what exposure time the tracking image having the relation degree of 100% is imaged when the main object is located on the corresponding vertical line.

In FIG. 17, the lines from the leading line to 527" and the lines from 528" to the final line indicate the outside of the angle-of-view 1203 in FIG. 15, and since there is no tracking image associated with the LV image, the tracking image degrees-of-association are all 0%. The specific region selecting/synthesizing circuit 916 selects or synthesizes a main object region indicating the main object position and the main object size based on the exposure overlap map generated by the relation degree information generation circuit 917 and the main object detection information for a plurality of frames detected by the specific region detection circuit 911.

A reference exposure image is determined in a manner similar to the process of the specific region selecting/synthesizing circuit 114 described in Embodiment 1, and it is confirmed at what exposure time in the exposure overlap map the main object centroid position included in the main object detection information in the reference exposure image is located. Subsequently, in accordance with the tracking image relation degree of the exposure overlap map corresponding to the main object centroid position, the main object region is selected based on the main object detection information for a plurality of frames or the main object detection information for a plurality of frames necessary for synthesis is selected.

If the selected main object detection information is only one frame, the main object detection information of the corresponding frame is output to the defocus amount calculator 908 to serve as the main object region information. If the selected main object detection information is for two or more frames, the main object position and the main object size in the main object information of each frame are synthesized and output to the defocus amount calculator 908 to serve as a synthesized main object region.

The display image pre-processor 907 extracts the phase difference image signals from the LV image signals including the phase difference image signal converted by the display image pickup element 905, outputs the phase difference image signals to the defocus amount calculator 908, and outputs the LV image signal to the image correction circuit 912. The image correction circuit 912 performs the process that is the same as the image correction circuit 106 described in Embodiment 1.

A display image data controller 915, the display image post-processor 918, the display device 919, the recording device 920, and the recording medium 921 perform the processes that are the same as the display image data controller 107, the display image post-processor 113, the display device 119, the recording device 116, and the recording medium 118 of Embodiment 1. The defocus amount calculator 908 has a phase difference information controller 909, and calculates an amount of defocusing in the main object region based on the main object region acquired from the specific region selecting/synthesizing circuit 916 and the phase difference image signals acquired from the display image pre-processor 907.

The defocusing amount is calculated for each rectangular region, and the phase difference image signals for a plurality of lines are used for the calculation of the defocusing amount in one rectangular region. Hence, the phase difference image signals acquired for each line are written and read to and from the phase difference information memory 910 through the phase difference information controller 909. Here, the calculation of the defocusing amount and the writing and reading of the phase difference image signal to and from the phase difference information memory 910 performed by the phase difference information controller 909 are limited to a rectangular region including the main object region, not to the whole angle-of-view in the LV image signals.

Thus, the defocus amount calculator reduces the amount of calculation processing and the amount of data for writing and reading to and from the memory. The defocus amount calculator 908 outputs the defocusing amount for each rectangular region including the main object region to the optical controller 903.

The optical controller 903 determines a rectangular region to be focused based on the defocusing amount for each rectangular region acquired from the defocus amount calculator 908 and the main object detection information acquired from the specific region detection circuit 911. Subsequently, the optical controller 903 executes focus control of the lens so as to reduce the defocusing amount of the determined rectangular region.

Figure 18:
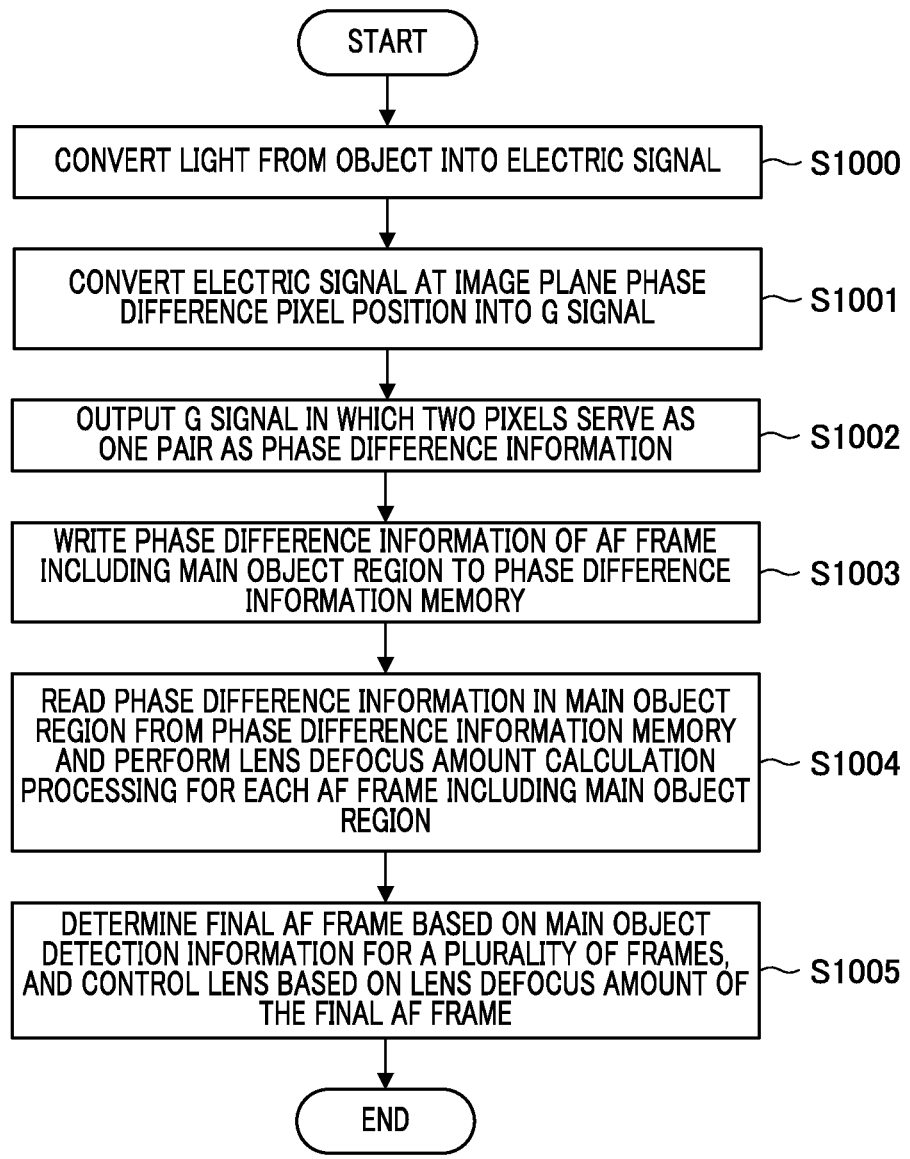
FIG. 18 is a flowchart illustrating a flow of the defocus amount calculation processing in Embodiment 2.

FIG. 18 is a flowchart that illustrates a flow of the defocusing amount calculation processing of the image pickup apparatus 900 according to Embodiment 2. The display image pickup element 905 receives optical signals from an object via the display optical system 902 of which the focus is adjusted by the optical controller 903, and converts the optical signals into electric signals (S1000). The electric signals at the image plane phase difference pixel position are output as phase difference image signals.

In contrast, electric signals obtained by light source conversion in a normal pixel that is not the image plane phase difference pixel are output to the display image pre-processor 907 to serve as the LV image signals. The display image pre-processor 907 converts the LV image signals from the display image pickup element 905 into the signals of each RGB color and converts the phase difference image signals into G (green) signals (S1001). The LV image signals converted into RGB signals are output to the image correction circuit 912.

The display image pre-processor 907 outputs the phase difference image signals converted into the G color signals to the defocus amount calculator 908 to serve as the phase difference information in which two pixels serve as one pair (S1002). The defocus amount calculator 908 divides the angle-of-view of the LV image signals into a plurality of rectangular regions. Subsequently, for each of the divided rectangular regions (AF frame), whether or not the AF frame includes the main object region acquired from the specific region selecting/synthesizing circuit 916 is determined, and the phase difference information in the AF frame including the main object region is written in the phase difference information memory 910 (S1003).

The defocus amount calculator 908 reads out phase difference information from the phase difference information memory 910 in units of AF frames, and performs defocusing amount calculation processing in units of AF frames (S1004). Since the phase difference information written to the phase difference information memory 910 in step S1003 is limited to the AF frame including the main object region, the defocusing amount calculation processing is also performed only in the AF frame including the main object region. If there is only one AF frame including the main object region, the defocusing amount is calculated once and output to the optical controller 903 to serve as a defocus amount in the AF frame.

If there are a plurality of AF frames including the main object region, the defocusing amount is calculated two or more times, and the defocusing amount of each of the AF frames is output to the optical controller 903. The optical controller 903 selects an AF frame having the highest possibility of including the centroid position of the main object based on the main object detection information of the plurality of frames acquired from the specific region detection circuit 911. Subsequently, it executes focus control of the lens based on the defocusing amount in the corresponding AF frame acquired from the defocus amount calculator 908 (S1005).

Figure 19:
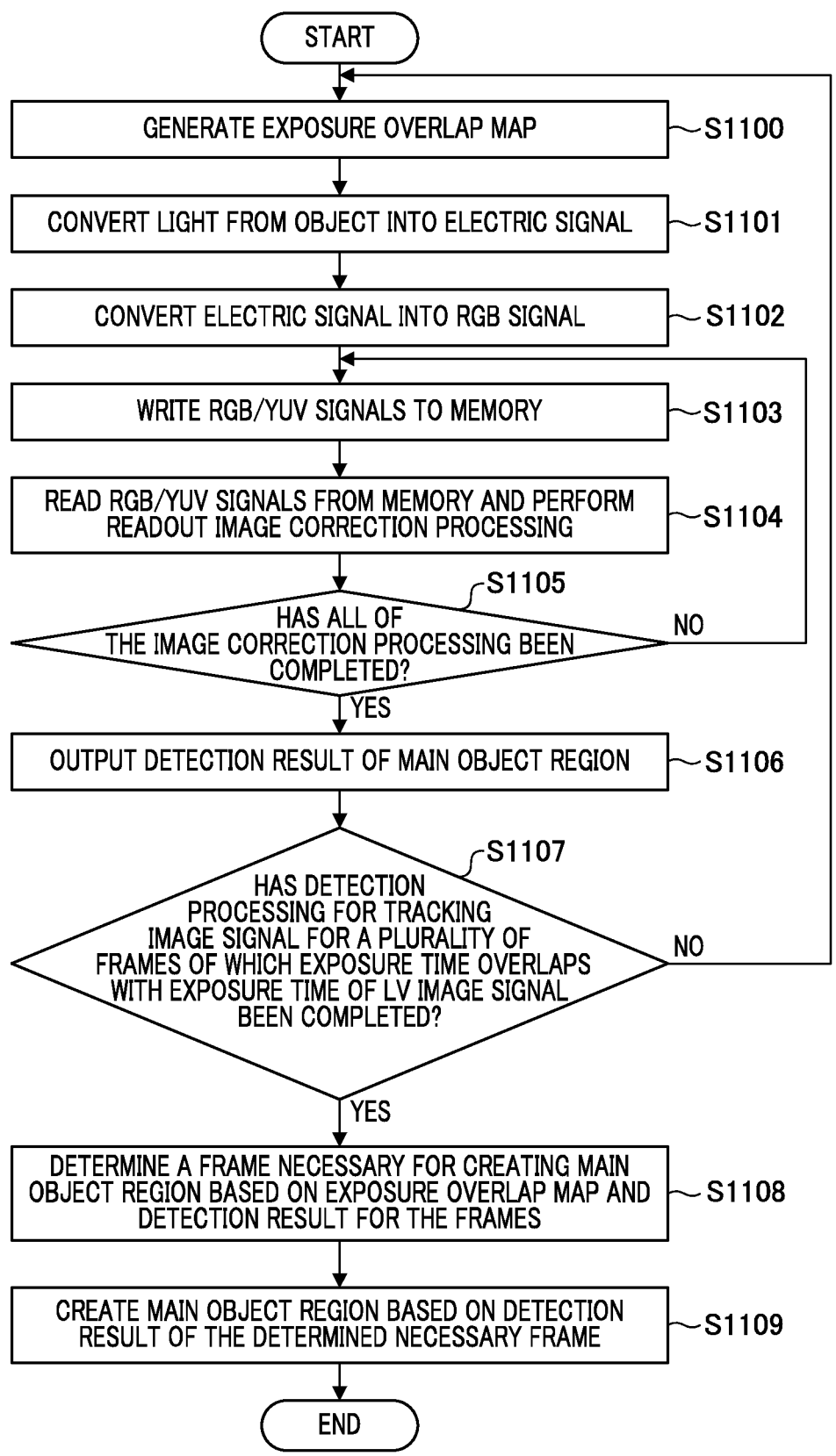
FIG. 19 is a flowchart illustrating a flow of the process that creates a main object region of the tracking image signal in Embodiment 2.

FIG. 19 is a flowchart that illustrates a flow of the process that creates a main object region based on the tracking image signals of the image pickup apparatus 900 according to Embodiment 2, and outputs the created main object region information to the defocus amount calculator 908. As described above, the relation degree information generation circuit 917 generates an exposure overlap map indicating the relation degree between the LV image signals for one frame and the tracking image signals for the plurality of frames (S1100).

At this time, an angle-of-view determined by the exposure start timing and exposure time of the LV image signals in the display image pickup element 905 and the state of the display optical system 902 during imaging are used. Additionally, the exposure overlap map is generated by using the exposure start timing and the exposure time of each of the tracking image signals for the plurality of frames in the detection and tracking image pickup element 904 and the angle-of-view of the detection and tracking optical system 901. The exposure overlap map is output to the specific region detection circuit 911 and the specific region selecting/synthesizing circuit 916.

Similarly to step S400, if the imaging cycle of the LV image signals for one frame is synchronized with the imaging cycle of the tracking image signals for a plurality of frames, the exposure overlap map generated once is repeatedly used a plurality of times. If they are not synchronized, the exposure overlap map is generated every time the LV image signals for one frame are captured.

The processes in steps S1101, S1102, S1103, S1104, and S1105 are the same as those in steps S200, S201, S202, S203, and S204, and their description will be omitted. When "YES" in step S1105, the specific region detection circuit 911 acquires the RGB signal/YUV signal for which the entire necessary image correction processing has been completed, and performs detection processing for the main object region (S1106). The detected main object detection information is output to the specific region selecting/synthesizing circuit 916.

Figure 20:
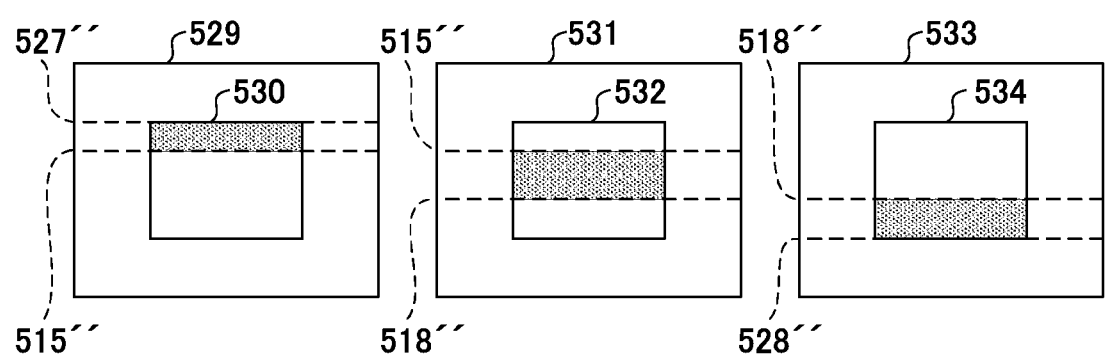
FIG. 20 illustrates object detection regions in the tracking image for each exposure start timing in Embodiment 2.

FIG. 20 illustrates how the detection region is limited in the tracking image signals of each frame of the tracking image signals of the plurality of frames based on the vertical line information of the exposure overlap map that has been acquired from the relation degree information generation circuit 917. Note that the detection region is limited in order to reduce the amount of calculation.

Tracking image signals 529 are tracking image signals captured during the exposure time 508, tracking image signals 531 are tracking image signals captured during the exposure time 509, and tracking image signals 533 are tracking image signals captured during the exposure time 510. Rectangles 530, 532, and 534 inside the respective tracking image signals indicate the angle-of-view of the LV image signals on the tracking image signals.

In this context, it is assumed that the main object position in the tracking image signals 529 is within the vertical line range from 527" to 515" in the exposure overlap map. In this case, it is determined that the main object in the LV image signals is highly associated with the tracking image signals captured during the exposure time 508. Subsequently, the specific region selecting/synthesizing circuit 916 selects the main object detection result in the tracking image signals captured during the exposure time 508 and generates a main object region.

Hence, the detection of the main object in the tracking image signals 529 imaged during the exposure time 508 may be performed by being limited to the inside of the rectangle 530 indicating the angle-of-view of the LV image signals and the vertical line range from 527" to 515". Similarly, the detection of the main object in the tracking image signals 531 may be performed by being limited to the inside of the rectangle 532 indicating the angle-of-view of the LV image signals and the vertical line range from 515" to 518".

Additionally, the detection of the main object in the tracking image signals 533 may be performed by being limited to the inside of the rectangle 530 indicating the angle-of-view of the LV image and the vertical line range from 518" to 528". Thus, the amount of calculation related to the detection processing can be reduced by switching the detection regions for each frame in the detection processing of the tracking image for the plurality of frames based on the exposure overlap map that is the relation degree information.

If the all of the detection processing of the tracking image signals for the plurality of frames of which the exposure time overlaps with the exposure time of the LV image signal has not been completed from the exposure overlap map acquired from the relation degree information generation circuit 917, the process proceeds to step S1100 in the next frame ("NO" in S1107). If all of the detection processing has been completed, the process proceeds to step S1108 ("YES" in S1107).

The specific region selecting/synthesizing circuit 916 selects one main object region based on the exposure overlap map acquired from the relation degree information generation circuit 917 and the main object detection information for the plurality of frames acquired from the specific region detection circuit 911. Alternatively, it determines a frame necessary for synthesis (S1108). The specific region selecting/synthesizing circuit 916 creates a main object region based on the main object detection information of the necessary frame determined in step S1108 (S1109). The main object region is output to the defocus amount calculator 908.

As described above, the image pickup apparatus 900 according to Embodiment 2 calculates a defocusing amount limited to the rectangular region including the main object region by using the main object region in which the positional deviation between the main object and the main object region caused by the motion of the main object is suppressed. Accordingly, it is possible to reduce the defocusing calculation amount, the memory access amount of the phase difference information, and the like.

Embodiment 3

Next, Embodiment 3 of the image pickup apparatus 900 will be described. In an image pick up apparatus according to Embodiment 3, when image compression processing of the LV image signals is performed in the display image post-processor 918, the compression ratio inside the main object region created by the specific region selecting/synthesizing circuit 916 is decreased to perform image compression processing with a high quality. Additionally, the compression ratio for the outside of the main object region is increased to perform compression processing with low image quality and high efficiency.

Thus, the compression ratio inside and outside the main object region is controlled while the positional deviation of the main object region from the position of the main object of the LV image signals is suppressed, and consequently, it is possible to realize the compression processing with high efficiency with a lower amount of data after compression while the deterioration of the image quality of the main object is suppressed.

Note that part or all of the control in the present embodiment may be supplied to the image pickup apparatus via a network or various storage media so as to realize the functions of the above-described embodiment. A computer (or, for example, CPU and MPU) in the image pickup apparatus may read out and execute the program. In this case, the program and the storage medium storing the program configure the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-145629 filed on Aug. 7, 2019, which is hereby incorporated by reference herein in its entirety.

What is claimed is:

1. An image pickup apparatus comprising:
   an imaging device that has a first image pickup unit configured to perform imaging in a first cycle and generate a first image signal, and a second image pickup unit configured to perform imaging in a second cycle shorter than the first image pickup unit and generate a plurality of second image signals;
   at least one processor or circuit which function as:
   a relation degree information generation unit configured to generate relation degree information between the first image signal and a second image signal of the plurality of second image signals based on overlap between an exposure time period in the first image pickup unit and an imaging timing in the second cycle of the second image pickup unit;
   a region selection unit configured to select a specific region from among the second image signals based on the relation degree information generated by the relation degree information generation unit; and
   an image processing unit configured to perform predetermined image processing on the first image signal based on the specific region selected by the region selection unit.

2. The image pickup apparatus according to claim 1, wherein the first cycle is an integer multiple of the second cycle.

3. The image pickup apparatus according to claim 1, the at least one processor or circuit further functions as a detection unit configured to detect a main object in the second image signal.

4. The image pickup apparatus according to claim 3, wherein the relation degree information is generated based on a position of the main object in the second image signal detected by the detection unit.

5. The image pickup apparatus according to claim 3, the at least one processor or circuit further functions as a tracking unit configured to track the main object in the second image signal detected by the detection unit.

6. The image pickup apparatus according to claim 1, wherein a ratio between a resolution of the first image pickup unit and a resolution of the second image pickup unit is set in accordance with a ratio between the first cycle and the second cycle.

7. The image pickup apparatus according to claim 1, wherein the predetermined image processing includes a process of overlapping a predetermined frame on a first image generated based on the first image signal.

8. The image pickup apparatus according to claim 1, wherein the predetermined image processing includes calculation processing related to a defocusing amount.

9. The image pickup apparatus according to claim 1, wherein the predetermined image processing includes image compression processing.

10. The image pickup apparatus according to claim 1, wherein the first image pickup unit and the second image pickup unit are configured by different image pickup elements.

11. The image pickup apparatus according to claim 1, wherein the first image pickup unit and the second image pickup unit are included in a common image pickup element.

12. A non-transitory computer-readable storage medium that stores a computer program to control an image pickup apparatus that comprise an imaging device that has a first image pickup unit configured to perform imaging in a first cycle and generate a first image signal, and a second image pickup unit configured to perform imaging in a second cycle that is shorter than the first image pickup unit and generate a plurality of second image signals; wherein the computer program compresses instructions for executing following processes:
   generating relation degree information between the first image signal and the plurality of second image signals based on overlap between an exposure time period in the first image pickup unit and the imaging timing in the second cycle of the second image pickup unit;
   selecting a specific region from among the plurality of second image signals based on the relation degree information generated by a relation degree information generation unit; and
   performing predetermined image processing on the first image signal based on the specific region selected by a region selection unit.

* * * * *